(12) United States Patent
Ohki et al.

(10) Patent No.: US 8,337,089 B2
(45) Date of Patent: Dec. 25, 2012

(54) MECHANICAL COMPONENT AND ROLLING BEARING

(75) Inventors: Chikara Ohki, Kuwana (JP); Kazuhiro Yagita, Kuwana (JP); Takashi Ito, Kuwana (JP); Hiroshi Morishita, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/744,665

(22) PCT Filed: Nov. 21, 2008

(86) PCT No.: PCT/JP2008/071218
§ 371 (c)(1),
(2), (4) Date: May 25, 2010

(87) PCT Pub. No.: WO2009/069547
PCT Pub. Date: Jun. 4, 2009

(65) Prior Publication Data
US 2010/0239205 A1    Sep. 23, 2010

(30) Foreign Application Priority Data

| Nov. 27, 2007 | (JP) | 2007-305659 |
| Nov. 27, 2007 | (JP) | 2007-306168 |
| Mar. 18, 2008 | (JP) | 2008-069531 |
| Mar. 18, 2008 | (JP) | 2008-069532 |

(51) Int. Cl.
*F16C 33/32* (2006.01)
*F16C 33/58* (2006.01)
*C23C 8/26* (2006.01)

(52) U.S. Cl. ........ 384/492; 384/569; 384/912; 148/318; 148/906

(58) Field of Classification Search .......... 384/513, 384/515, 523, 527, 564, 569, 572, 573, 576, 384/912, 913, 492; 148/318, 333, 906; 420/109
See application file for complete search history.

(56) References Cited

U.S. PATENT DOCUMENTS 5,110,257 A * 5/1992 Hibner et al. .............. 415/119
(Continued)

FOREIGN PATENT DOCUMENTS

CN    1611628 A    5/2005
(Continued)

OTHER PUBLICATIONS

Chinese Office Action, w/ English translation thereof, issued in Chinese Patent Application No. 200880118689.0, dated Sep. 23, 2011.
(Continued)

*Primary Examiner* — James Pilkington
*Assistant Examiner* — Adam D Rogers
(74) *Attorney, Agent, or Firm* — McDermott Will & Emery LLP

(57) ABSTRACT

An outer ring, an inner ring and a ball serving as mechanical components configuring a deep groove ball bearing are formed of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity, and have raceway/rolling contact surfaces, the surface being included in a region having a nitrogen enriched layer having a nitrogen concentration of at least 0.05 mass %, the nitrogen enriched layer having a carbon concentration and the nitrogen concentration, in total, of at least 0.82 mass % and not more than 1.9 mass %.

7 Claims, 21 Drawing Sheets

U.S. PATENT DOCUMENTS

| | | | |
|---|---|---|---|
| 5,165,804 A * | 11/1992 | Fisher et al. | 384/492 |
| 5,352,303 A | 10/1994 | Murakami et al. | |
| 5,672,014 A * | 9/1997 | Okita et al. | 384/492 |
| 5,717,186 A | 2/1998 | Drissen et al. | |
| 5,772,795 A | 6/1998 | Lally et al. | |
| 6,142,674 A * | 11/2000 | Bayer | 384/482 |
| 6,158,894 A * | 12/2000 | Pujari et al. | 384/492 |
| 6,179,933 B1 * | 1/2001 | Dodd et al. | 148/222 |
| 6,328,818 B1 | 12/2001 | Miyagi et al. | |
| 6,409,464 B1 * | 6/2002 | Fisher et al. | 415/1 |
| 6,471,410 B1 * | 10/2002 | Jacobson et al. | 384/492 |
| 6,742,934 B2 * | 6/2004 | Matsuyama et al. | 384/572 |
| 7,690,847 B2 * | 4/2010 | Ohki et al. | 384/492 |
| 8,070,364 B2 | 12/2011 | Beer et al. | |
| 2004/0071379 A1 * | 4/2004 | Carrerot | 384/565 |
| 2004/0079448 A1 * | 4/2004 | Rhoads et al. | 148/230 |
| 2004/0179762 A1 * | 9/2004 | Doll et al. | 384/492 |
| 2005/0047694 A1 | 3/2005 | Nozaki et al. | |
| 2005/0141797 A1 * | 6/2005 | Kinno et al. | 384/492 |
| 2005/0207687 A1 * | 9/2005 | Fujita et al. | 384/492 |
| 2006/0029318 A1 | 2/2006 | Beer et al. | |
| 2006/0153483 A1 | 7/2006 | Bridges et al. | |
| 2007/0269336 A1 * | 11/2007 | Ohki et al. | 420/101 |
| 2009/0245706 A1 | 10/2009 | Morishita et al. | |

FOREIGN PATENT DOCUMENTS

| | | |
|---|---|---|
| EP | 1 413 631 A2 | 4/2004 |
| EP | 1 517 058 A | 3/2005 |
| JP | 2-57675 | 2/1990 |
| JP | 7-118826 | 5/1995 |
| JP | 9-3646 | 1/1997 |
| JP | 9-133130 | 5/1997 |
| JP | 2003-148485 | 5/2003 |
| JP | 2003-148488 | 5/2003 |
| JP | 2005-504879 | 2/2005 |
| WO | WO 2006/071502 A2 | 7/2006 |

OTHER PUBLICATIONS

Letter from Jessica Avery, Corporate Counsel at NHBB, New Hampshire Ball Bearings, Inc., A Minebea Company, dated Jan. 11, 2012.
Extended European Search Report, issued in European Patent Application No. 08 855 002.5, dated Dec. 15, 2011.
Extended European Search Report, issued in European Patent Application No. 11 180 165.0, dated Dec. 16, 2011.
United States Office Action issued in U.S. Appl. No. 13/238,889 dated Sep. 26, 2012.

* cited by examiner

US 8,337,089 B2

MECHANICAL COMPONENT AND ROLLING BEARING

RELATED APPLICATIONS

This application is the U.S. National Phase under 35 U.S.C. §371 of International Application No. PCT/JP2008/071218, filed on Nov. 21, 2008, which in turn claims the benefit of Japanese Application Nos. 2007-305659 and 2007-306168, filed on Nov. 27, 2007, and 2008-069531 and 2008-069532, filed on Mar. 18, 2008, the disclosures of which Applications are incorporated by reference herein.

TECHNICAL FIELD

The present invention relates generally to mechanical components and rolling bearings, and particularly to mechanical components that are formed of steel containing at least 3.75 mass % of chromium and have a surface layer portion with a nitrogen enriched layer, and rolling bearings including ceramic rolling elements.

BACKGROUND ART

In order to obtain a mechanical component of steel having a surface layer portion enhanced in strength, a treatment is sometimes performed to provide the surface layer portion with a layer having a higher nitrogen concentration than the remaining region, i.e., a nitrogen enriched layer. For example, a nitriding treatment is performed. A conventional nitriding method for steel is representatively a gas soft nitriding treatment in which steel is heated in an atmosphere containing ammonia or a similar gas serving as a source of nitrogen to cause the nitrogen to penetrate into a surface layer portion of the steel. However, when steel containing chromium in a large amount such as at least 3.75 mass %, for example, is used to produce a mechanical component, the mechanical component has a surface layer portion having chemically stable oxide film. As such, when the mechanical component formed of steel containing chromium in the large amount undergoes the gas soft nitriding treatment the surface layer portion is not penetrated by nitrogen and the nitrogen enriched layer is not formed.

To address this, a plasma nitriding process is proposed as follows: an object of steel to be treated is placed in a vacuumed furnace and a gas containing a gas serving as a source of nitrogen is introduced into the furnace, and between the object and a member, such as a wall of the furnace, disposed to face the object a difference in potential is caused to cause glow discharge to cause nitrogen to penetrate into a surface layer portion of the steel configuring the object (see Japanese Patent Laying-open No. 2-57675 (Patent Document 1) for example). The plasma nitriding process is controlled for example as based on a spectral analysis of glow discharge, a density of a current flowing in the object, or the like, as proposed in Japanese Patent Laying-Open No. 7-118826 (Patent Document 2) and Japanese Patent Laying-Open No. 9-3646 (Patent Document 3). This allows a mechanical component formed of steel containing at least 3.75 mass % of chromium to have a surface layer portion provided with a nitrogen enriched layer.

Following the recent improvement in performance and efficiency of a mechanical device employing a rolling bearing, high durability in a severe environment tends to be required to the rolling bearing. More specifically, a rolling bearing employed in a contaminated environment penetrated by hard foreign matter may be damaged in an early stage (in an operating time shorter than a calculated life of the bearing) due to gripping of the foreign matter. Furthermore, a rolling bearing rotating at high speed may have smearing even if the bearing is under relatively small load. Furthermore, a rolling bearing used in an insufficiently lubricated environment may cause seizure. When the rolling bearing is used in a high-temperature environment of a temperature exceeding 200° C., for example, hardness of components (bearing components) constituting the rolling bearing may be reduced, to reduce the durability of the rolling bearing.

When the bearing components are made of steel, strength at a high temperature can be improved for improving the durability of the rolling bearing in the high-temperature environment by adding at least 3.75 mass % of chromium to the steel thereby improving tempering softening resistance of the steel. In order to improve the durability in the contaminated environment, a treatment of forming nitrogen-enriched layers having higher nitrogen concentrations than the remaining regions on surface layer portions of the bearing components by performing nitriding, for example, can be employed.

In bearing components made of steel having a high chromium content of at least 3.75 mass %, for example, chemically stable oxide films are formed on the surface layer portions. When ordinary nitriding is performed on these components, therefore, nitrogen does not penetrate into the surface layer portions thereof, and no nitrogen-enriched layers are formed. In relation to this, there is proposed a countermeasure of forming nitrogen-enriched layers by performing a plasma nitriding process, as described above.

In order to improve seizure resistance, there is proposed a countermeasure of dipping balls serving as the bearing components in an organic phosphorus compound for forming reaction layers on the surfaces thereof (refer to Japanese Patent Laying-Open No. 9-133130 (Patent Document 4), for example).

Patent Document 1: Japanese Patent Laying-open No. 2-57675
Patent Document 2: Japanese Patent Laying-open No. 7-118826
Patent Document 3: Japanese Patent Laying-open No. 9-3646
Patent Document 4: Japanese Patent Laying-open No. 9-133130

DISCLOSURE OF THE INVENTION

Problems to be Solved by the Invention

Even if the nitrogen-enriched layers are formed on the surface layer portions of the mechanical component (including bearing components) made of the steel containing at least 3.75 mass % of chromium, as described above, however, the characteristics of the mechanical components may not be sufficiently improved. In other words, flaking or fracture may be caused in an early stage when stress is repetitively applied to the aforementioned mechanical components (reduction in fatigue resistance). Further, breakage may be easily caused when impactive stress is applied to the aforementioned mechanical components (reduction in toughness). Thus, sufficient characteristics may not necessarily be attained particularly in fatigue resistance and toughness when merely nitrogen-enriched layers are formed on the mechanical components made of the steel containing at least 3.75 mass % of chromium, although the surface layer portions thereof are improved in hardness.

The environment in which the rolling bearing is used is becoming increasingly severe. To a rolling bearing used for a jet engine of an aircraft or the like, for example, not only suppression of reduction in hardness of bearing components in a high-temperature environment and improvement in durability in a contaminated environment and smearing resistance, but also improvement of seizure resistance in a case where lubrication is temporarily stopped (improvement of the so-called dry-nm performance) are required. Therefore, conventional countermeasures including those disclosed in the aforementioned Patent Documents 1 to 4 cannot necessarily be regarded as sufficient.

Accordingly, an object of the present invention is to provide a mechanical component that is formed of steel containing at least 3.75 mass % of chromium, and also has a surface layer portion having a nitrogen enriched layer, and also ensures sufficient fatigue resistance and toughness. Another object of the present invention is to provide a rolling bearing capable of attaining not only suppression of reduction in hardness of bearing components in a high-temperature environment and improvement in durability in a contaminated environment and smearing resistance, but also improvement of dry-nm performance.

Means for Solving the Problems

A mechanical component according to one aspect of the present invention is constituted of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity. The mechanical component is provided with a nitrogen-enriched layer having a nitrogen concentration of at least 0.05 mass % formed on a region including a surface. The total of a carbon concentration and the nitrogen concentration in the nitrogen-enriched layer is at least 0.82 mass % and not more than 1.9 mass %.

The inventors have conducted detailed studies as to the reason why fatigue resistance and toughness are reduced when a nitrogen-enriched layer is formed on a mechanical component made of steel containing at least 3.75 mass % of chromium. As a result, it has been recognized that the fatigue resistance and the toughness of the mechanical component are reduced due to the following phenomenon:

When the nitrogen-enriched layer is formed on the mechanical component made of steel containing at least 3.75 mass % of chromium by plasma nitriding as hereinabove described, the quantity of nitrogen on the surface layer portion exceeds the solubility limit (solubility limit including nitrogen contained in precipitates) of the steel constituting the mechanical component. Therefore, nitrides of iron ($Fe_3N$, $Fe_4N$ etc.) precipitated along grain boundaries are formed in the steel constituting the mechanical component. Nitrides of iron each having an aspect ratio of at least 2 and a length of at least 7.5 μm (nitrides of iron each having an aspect ratio of at least 2 and a length of at least 7.5 μm formed along grain boundaries are hereinafter referred to as grain boundary precipitates) may serve as starting points of flaking and fracture.

More specifically, when stress is repetitively applied to a mechanical component having grain boundary precipitates formed therein, the stress may be concentrated on the grain boundary precipitates, to cause cracking. This cracking progresses to result in flaking or fracture, leading to reduction in fatigue resistance of the mechanical component. When impactive stress is applied to the mechanical component having the grain boundary precipitates formed therein, the grain boundary precipitates promote formation or progress of cracking, and hence toughness may be reduced. In other words, an excess quantity of nitrogen penetrates into the surface layer portion of the mechanical component to form the grain boundary precipitates, and the fatigue resistance or toughness of the mechanical component can be reduced due to the grain boundary precipitates.

In the mechanical component according to one aspect of the present invention, on the other hand, the nitrogen-enriched layer having the nitrogen concentration of at least 0.05 mass % is formed on the region including the surface of the mechanical component made of the steel having the proper component composition and the total of the carbon concentration and the nitrogen concentration in the nitrogen-enriched layer is set in the proper range, whereby formation of grain boundary precipitates can be suppressed. As a result, a mechanical component made of steel containing at least 3.75 mass % of chromium and provided with a nitrogen-enriched layer on a surface layer portion thereof while sufficiently ensuring fatigue resistance and toughness can be provided according to the mechanical component of the present invention. The reasons why the components of the steel constituting the present mechanical component and the concentrations of nitrogen and carbon in the nitrogen-enriched layer are limited in the aforementioned ranges will now be described.

Carbon Content: at least 0.77 mass % and not more than 0.85 mass %

If the carbon content is less than 0.77 mass % in the steel constituting the mechanical component, there can arise such a problem that sufficient matrix hardness cannot be attained. If the carbon content exceeds 0.85 mass %, on the other hand, there can arise such a problem that a coarse carbide (cementite: $Fe_3C$) is formed. Therefore, the carbon content must be set to at least 0.77 mass % and not more than 0.85 mass %.

Silicon Content: at least 0.01 mass % and not more than 0.25 mass %

If the silicon content is less than 0.01 mass % in the steel constituting the mechanical component, there can arise such a problem that the production cost for the steel is increased. If the silicon content exceeds 0.25 mass %, on the other hand, there can arise such problems that hardness of the material is increased and cold workability is reduced. Therefore, the silicon content must be set to at least 0.01 mass % and not more than 0.25 mass %.

Manganese Content: at least 0.01 mass % and not more than 0.35 mass %

If the manganese content is less than 0.01 mass % in the steel constituting the mechanical component, there can arise such a problem that the production cost for the steel is increased. If the manganese content exceeds 0.35 mass %, on the other hand, there can arise such problems that the hardness of the material is increased and the cold workability is reduced. Therefore, the manganese content must be set to at least 0.01 mass % and not more than 0.35 mass %.

Nickel Content: at least 0.01 mass % and not more than 0.15 mass %

If the nickel content is less than 0.01 mass % in the steel constituting the mechanical component, there can arise such a problem that the production cost for the steel is increased. If the nickel content exceeds 0.15 mass %, on the other hand, there can arise such a problem that the quantity of retained austenite is increased. Therefore, the nickel content must be set to at least 0.01 mass % and not more than 0.15 mass %.

Chromium Content: at least 3.75 mass % and not more than 4.25 mass %

If the chromium content is less than 3.75 mass % in the steel constituting the mechanical component, there can arise such a problem that tempering softening resistance is reduced. If the chromium content exceeds 4.25 mass %, on the other hand, there can arise such a problem that solid solution of a carbide is inhibited. Therefore, the chromium content must be set to at least 3.75 mass % and not more than 4.25 mass %.

Molybdenum Content: at least 4 mass % and not more than 4.5 mass %

If the molybdenum content is less than 4 mass % in the steel constituting the mechanical component, there can arise such a problem that the tempering softening resistance is reduced. If the molybdenum content exceeds 4.5 mass %, on the other hand, there can arise such a problem that the production cost for the steel is increased. Therefore, the molybdenum content must be set to at least 4 mass % and not more than 4.5 mass %.

Vanadium Content: at least 0.9 mass % and not more than 1.1 mass %

If the vanadium content is less than 0.9 mass % in the steel constituting the mechanical component, there can arise such problems that the tempering softening resistance is reduced and an effect of refinement of the structure resulting from addition of vanadium is reduced. If the vanadium content exceeds 1.1 mass %, on the other hand, there can arise such a problem that the production cost for the steel is increased. Therefore, the vanadium content must be set to at least 0.9 mass % and not more than 1.1 mass %.

Nitrogen Concentration in Nitrogen-Enriched Layer: at least 0.05 mass %

In order to supply sufficient hardness to the surface layer portion for ensuring wear resistance etc. in the mechanical component made of the aforementioned steel, the nitrogen-enriched layer having the nitrogen concentration of at least 0.05 mass % must be formed on the region including the surface. In order to further improve the wear resistance etc., the nitrogen concentration in the surface of the mechanical component is preferably at least 0.15 mass %.

Total of Nitrogen Concentration and Carbon Concentration in Nitrogen-Enriched Layer: at least 0.82 mass % and not more than 1.9 mass %

In order to supply sufficient hardness to the surface layer portion for ensuring the wear resistance etc. in the mechanical component made of the aforementioned steel, it is important to control not only the nitrogen concentration but also the carbon concentration. The inventors have found that it is difficult to supply sufficient hardness to the surface layer portion for ensuring the wear resistance etc. if the total of the nitrogen concentration and the carbon concentration in the nitrogen-enriched layer is less than 0.82 mass %. Therefore, the total of the nitrogen concentration and the carbon concentration in the nitrogen-enriched layer must be set to at least 0.82 mass %. In order to easily supply sufficient hardness to the surface layer portion for ensuring the wear resistance etc., the total of the nitrogen concentration and the carbon concentration in the nitrogen-enriched layer is preferably set to at least 0.97 mass %.

On the other hand, grain boundary precipitates are easily formed if the nitrogen concentration in the surface layer portion is increased in the mechanical component made of the aforementioned steel, and this tendency is further strengthened if the carbon concentration is increased. The inventors have found that it is difficult to suppress formation of grain boundary precipitates if the total of the nitrogen concentration and the carbon concentration in the nitrogen-enriched layer exceeds 1.9 mass %. Therefore, the total of the nitrogen concentration and the carbon concentration in the nitrogen-enriched layer must be set to not more than 1.9 mass %. In order to further suppress formation of grain boundary precipitates, the total of the nitrogen concentration and the carbon concentration in the nitrogen-enriched layer is preferably set to not more than 1.7 mass %. The carbon concentration and the nitrogen concentration denote concentrations in the matrix (mother phase) which is a region other than carbides of iron, chromium etc.

Preferably in the above mechanical component, the thickness of the aforementioned nitrogen-enriched layer is at least 0.11 mm. In bearings, hubs, constant velocity joints, gears and other mechanical components, the strength of the surface and a portion immediately under the surface, more specifically a region within 0.11 mm in distance from the surface may generally be important. Therefore, the thickness of the aforementioned nitrogen-enriched layer is so set to at least 0.11 mm that sufficient strength can be supplied to the mechanical component. In order to render the strength of the mechanical component more sufficient, the thickness of the aforementioned nitrogen-enriched layer is preferably at least 0.15 mm.

Preferably in the above mechanical component, the aforementioned nitrogen-enriched layer has hardness of at least 830 HV. The hardness of the nitrogen-enriched layer formed on the surface layer portion is so set to at least 830 HV that the strength of the mechanical component can be more reliably ensured.

Preferably in the above mechanical component, the number of nitrides of iron each having an aspect ratio of at least 2 and a length of at least 7.5 μm is not more than one in five fields of view of square regions of 150 μm on each side when the aforementioned nitrogen-enriched layer is observed with a microscope.

As hereinabove described, grain boundary precipitates of nitride of iron each having an aspect ratio of at least 2 and a length of at least 7.5 μm may reduce characteristics such as the fatigue resistance and the toughness of the mechanical components. The inventors have investigated the relation between the fatigue resistance and the number density of grain boundary precipitates as to a mechanical component made of steel having the aforementioned component composition, to find that the fatigue resistance of the mechanical component is reduced if the grain boundary precipitates are present in a number density exceeding one in five fields of view of square regions of 150 μm on each side when the aforementioned nitrogen-enriched layer is observed with a microscope. If the number of grain boundary precipitates is not more than one in five fields of view of square regions of 150 μm on each side when the nitrogen-enriched layer is observed with a microscope, therefore, the fatigue resistance of the mechanical component can be improved. In order to further improve the fatigue resistance of the mechanical component, the number of the aforementioned grain boundary precipitates is preferably not more than one in 60 fields of view of square regions of 150 μm on each side.

The present mechanical component may be used as a component configuring a bearing. The present mechanical component that has a surface layer portion nitrided and thus reinforced and also reduces/prevents grain boundary precipitates is suitable as a component configuring a bearing, which is a mechanical component required to have fatigue resistance, wear resistance, and the like.

The above mechanical component may be used to configure a rolling bearing including a bearing ring and a rolling element arranged in contact with the bearing ring on an annular raceway. More specifically, one of or preferably both the bearing ring and the rolling element is/are the above mechanical component(s). The present mechanical component that has a surface layer portion nitrided and thus reinforced and also reduces/prevents grain boundary precipitates allows the rolling bearing to have long life.

The concentrations of nitrogen and carbon in the nitrogen-enriched layer can be investigated by EPMA (electron probe microanalysis), for example. The number density of the aforementioned nitrides of iron (grain boundary precipitates) can be investigated as follows, for example: First, the mechanical component is cut along a section perpendicular to the surface thereof, and this section is polished. Then, the section is etched with a proper etchant, and the nitrogen-enriched layer is thereafter observed with an SEM (scanning electron microscope) or an optical microscope and photographed. A square field of view having each side of 150 μm and one side corresponding to the surface is analyzed with an image analyzer, for investigating the number of grain boundary precipitates. This analysis is randomly performed in at least five fields of view, for calculating the number of grain boundary precipitates in five fields of view.

The rolling bearing in one aspect of the present invention includes a race member and a plurality of rolling elements disposed in contact with the race member on an annular raceway. The race member is the mechanical component in one aspect above, and the rolling element is formed of ceramic.

In the rolling bearing according to one aspect of the present invention, the rolling elements are made of ceramics. Thus, smearing is suppressed, and the race member and the rolling elements coming into contact with each other are made of different materials, whereby the seizure resistance is improved. Further, ceramics harder than steel is so employed as the material for the rolling elements that the durability of the rolling elements in a contaminated environment is improved. As a result, smearing resistance, and durability in an environment having foreign matters introduced therein are enhanced, and simultaneously, durability in an environment with insufficient lubricity, such as dry-run performance, is enhanced. In addition, the rolling elements are so made of ceramics that reduction in hardness of the rolling elements in a high-temperature environment is suppressed. As the ceramics constituting the rolling elements, silicon nitride, sialon, alumina or zirconia, for example, can be employed.

In the rolling bearing according to one aspect of the present invention, as hereinabove described, the race member is made of the steel containing at least 3.75 mass % of chromium, and the rolling element is formed of ceramic, whereby reduction in hardness of the bearing components in a high-temperature environment is suppressed. Further, the nitrogen-enriched layer having the total of the carbon concentration and the nitrogen concentration set in the proper range is formed on the surface layer portion of the race member made of the steel having the proper component composition, and the rolling element is formed of ceramic, whereby the durability of the bearing components in a contaminated environment is improved. Furthermore the race member formed of steel in combination with the ceramic rolling element can improve smearing resistance and dry-run performance. Consequently, a rolling bearing capable of attaining not only suppression of reduction in hardness of the bearing components in a high-temperature environment, improvement in durability in a contaminated environment and improvement in smearing resistance but also improvement of the dry-run performance can be provided according to the present invention.

The rolling bearing according to one aspect of the present invention may be employed as a bearing supporting a rotating member which is a main shaft or a member rotating upon rotation of the main shaft to be rotatable with respect to a member adjacent to the rotating member in a gas turbine engine. To such a bearing supporting the rotating member (the main shaft or the member rotating upon rotation of the main shaft) in the gas turbine engine, suppression of reduction in hardness of bearing components in a high temperature environment, improvement of durability in a contaminated environment, improvement in smearing resistance and improvement of dry-run performance are required. Therefore, the rolling bearing according to the present invention capable of attaining not only suppression of reduction in hardness of bearing components in a high-temperature environment, improvement in durability in a contaminated environment and improvement in smearing resistance but also improvement of dry-run performance is suitable as a bearing supporting a rotating member in a gas turbine engine.

A mechanical component according to another aspect of the present invention is constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity. The mechanical component is provided with a nitrogen-enriched layer having a nitrogen concentration of at least 0.05 mass % formed on a region including a surface, and the total of a carbon concentration and the nitrogen concentration in the nitrogen-enriched layer is at least 0.55 mass % and not more than 1.9 mass %.

In the mechanical component according to another aspect of the present invention, on the other hand, the nitrogen-enriched layer having the nitrogen concentration of at least 0.05 mass % is formed on the region including the surface of the mechanical component made of the steel having the proper component composition and the total of the carbon concentration and the nitrogen concentration in the nitrogen-enriched layer is set in the proper range, whereby formation of grain boundary precipitates can be suppressed. As a result, a mechanical component made of steel containing at least 4 mass % of chromium and provided with a nitrogen-enriched layer on a surface layer portion thereof while sufficiently ensuring fatigue resistance and toughness can be provided according to the mechanical component of the present invention. The reasons why the components of the steel constituting the present mechanical component and the concentrations of nitrogen and carbon in the nitrogen-enriched layer are limited in the aforementioned ranges will now be described.

Carbon Content: at least 0.11 mass % and not more than 0.15 mass %

If the carbon content is less than 0.11 mass % in the steel constituting the mechanical component, there can arise such a problem that the production cost for the steel is increased. If the carbon content exceeds 0.15 mass %, on the other hand, there can arise such problems that core hardness is increased and toughness is reduced. Therefore, the carbon content must be set to at least 0.11 mass % and not more than 0.15 mass %.

Silicon Content: at least 0.1 mass % and not more than 0.25 mass %

If the silicon content is less than 0.1 mass % in the steel constituting the mechanical component, there can arise such a problem that the production cost for the steel is increased. If the silicon content exceeds 0.25 mass %, on the other hand, there can arise such problems that hardness of the material is increased and cold workability is reduced. Therefore, the silicon content must be set to at least 0.1 mass % and not more than 0.25 mass %.

Manganese Content: at least 0.15 mass % and not more than 0.35 mass %

If the manganese content is less than 0.15 mass % in the steel constituting the mechanical component, there can arise such a problem that the production cost for the steel is increased. If the manganese content exceeds 0.35 mass %, on the other hand, there can arise such problems that the hardness of the material is increased and the cold workability is reduced. Therefore, the manganese content must be set to at least 0.15 mass % and not more than 0.35 mass %.

Nickel Content: at least 3.2 mass % and not more than 3.6 mass %

If the nickel content is less than 3.2 mass % in the steel constituting the mechanical component, there can arise such a problem that effects of improving corrosion resistance, hardness and toughness are reduced. If the nickel content exceeds 3.6 mass %, on the other hand, there can arise such a problem that the quantity of retained austenite is increased. Therefore, the nickel content must be set to at least 3.2 mass % and not more than 3.6 mass %.

Chromium Content: at least 4 mass % and not more than 4.25 mass %

If the chromium content is less than 4 mass % in the steel constituting the mechanical component, there can arise such a problem that tempering softening resistance is reduced. If the chromium content exceeds 4.25 mass %, on the other hand, there can arise such a problem that solid solution of a carbide is inhibited. Therefore, the chromium content must be set to at least 4 mass % and not more than 4.25 mass %.

Molybdenum Content: at least 4 mass % and not more than 4.5 mass %

If the molybdenum content is less than 4 mass % in the steel constituting the mechanical component, there can arise such a problem that the tempering softening resistance is reduced. If the molybdenum content exceeds 4.5 mass %, on the other hand, there can arise such a problem that the production cost for the steel is increased. Therefore, the molybdenum content must be set to at least 4 mass % and not more than 4.5 mass %.

Vanadium Content: at least 1.13 mass % and not more than 1.33 mass %

If the vanadium content is less than 1.13 mass % in the steel constituting the mechanical component, there can arise such problems that the tempering softening resistance is reduced and an effect of refinement of a microstructure resulting from addition of vanadium is reduced. If the vanadium content exceeds 1.33 mass %, on the other hand, there can arise such a problem that the production cost for the steel is increased. Therefore, the vanadium content must be set to at least 1.13 mass % and not more than 1.33 mass %.

Nitrogen Concentration in Nitrogen-Enriched Layer: at least 0.05 mass %

In order to supply sufficient hardness to the surface layer portion for ensuring wear resistance etc. in the mechanical component made of the aforementioned steel, the nitrogen-enriched layer having the nitrogen concentration of at least 0.05 mass % must be formed on the region including the surface. In order to further improve the wear resistance etc., the nitrogen concentration in the surface of the mechanical component is preferably at least 0.15 mass %.

Total of Nitrogen Concentration and Carbon Concentration in Nitrogen-Enriched Layer: at least 0.55 mass % and not more than 1.9 mass %

In order to supply sufficient hardness to the surface layer portion for ensuring the wear resistance etc. in the mechanical component made of the aforementioned steel, it is important to control not only the nitrogen concentration but also the carbon concentration. The inventors have found that it is difficult to supply sufficient hardness to the surface layer portion for ensuring the wear resistance etc. if the total of the nitrogen concentration and the carbon concentration in the nitrogen-enriched layer is less than 0.55 mass %. Therefore, the total of the nitrogen concentration and the carbon concentration in the nitrogen-enriched layer must be set to at least 0.55 mass %. In order to easily supply sufficient hardness to the surface layer portion for ensuring the wear resistance etc., the total of the nitrogen concentration and the carbon concentration in the nitrogen-enriched layer is preferably set to at least 0.7 mass %.

On the other hand, grain boundary precipitates are easily formed if the nitrogen concentration in the surface layer portion is increased in the mechanical component made of the aforementioned steel, and this tendency is further strengthened if the carbon concentration is increased. The inventors have found that it is difficult to suppress formation of grain boundary precipitates if the total of the nitrogen concentration and the carbon concentration in the nitrogen-enriched layer exceeds 1.9 mass %. Therefore, the total of the nitrogen concentration and the carbon concentration in the nitrogen-enriched layer must be set to not more than 1.9 mass %. In order to further suppress formation of grain boundary precipitates, the total of the nitrogen concentration and the carbon concentration in the nitrogen-enriched layer is preferably set to not more than 1.7 mass %. The carbon concentration and the nitrogen concentration denote concentrations in the matrix (mother phase) which is a region other than carbides and nitrides of iron, chromium etc.

Preferably in the mechanical component in the above other aspect, the thickness of the aforementioned nitrogen-enriched layer is at least 0.11 mm. In bearings, hubs, constant velocity joints, gears and other mechanical components, the strength of the surface and a portion immediately under the surface, more specifically a region within 0.11 mm in distance from the surface may generally be important. Therefore, the thickness of the aforementioned nitrogen-enriched layer is so set to at least 0.11 mm that sufficient strength can be supplied to the mechanical component. In order to render the strength of the mechanical component more sufficient, the thickness of the aforementioned nitrogen-enriched layer is preferably at least 0.15 mm.

Preferably in the mechanical component in the above other aspect, the aforementioned nitrogen-enriched layer has hardness of at least 800 HV. The hardness of the nitrogen-enriched layer formed on the surface layer portion is so set to at least 800 HV that the strength of the mechanical component can be more reliably ensured.

Preferably in the mechanical component in the above other aspect, the number of nitrides of iron each having an aspect ratio of at least 2 and a length of at least 7.5 μm is not more than one in five fields of view of square regions of 150 μm on each side when the aforementioned nitrogen-enriched layer is observed with a microscope.

As hereinabove described, grain boundary precipitates of nitride of iron each having an aspect ratio of at least 2 and a length of at least 7.5 μm may reduce characteristics such as the fatigue resistance and the toughness of the mechanical components. The inventors have investigated the relation between the fatigue resistance and the number density of grain boundary precipitates as to a mechanical component made of steel having the aforementioned component composition, to find that the fatigue resistance of the mechanical component is reduced if the grain boundary precipitates are present in a number density exceeding one in five fields of view of square regions of 150 μm on each side when the aforementioned nitrogen-enriched layer is observed with a microscope. If the number of grain boundary precipitates is not more than one in five fields of view of square regions of 150 μm on each side when the nitrogen-enriched layer is observed with a microscope, therefore, the fatigue resistance of the mechanical component can be improved. In order to further improve the fatigue resistance of the mechanical component, the number of the aforementioned grain boundary precipitates is preferably not more than one in 60 fields of view of square regions of 150 μm on each side.

The mechanical component of the present invention in another aspect may be used as a component configuring a bearing. The present mechanical component that has a surface layer portion nitrided and thus reinforced and also reduces/prevents grain boundary precipitates is suitable as a component configuring a bearing, which is a mechanical component required to have fatigue resistance, wear resistance, and the like.

The mechanical component in the above other aspect may be used to configure a rolling bearing including a bearing ring and a rolling element arranged in contact with the bearing ring on an annular raceway. More specifically, one of or preferably both the bearing ring and the rolling element is/are the above mechanical component(s). The present mechanical component that has a surface layer portion nitrided and thus reinforced and also reduces/prevents grain boundary precipitates allows the rolling bearing to have long life.

The rolling bearing in another aspect of the present invention includes a race member and a plurality of rolling elements disposed in contact with the race member on an annular raceway. The race member is the mechanical component in the above other aspect, and the rolling element is formed of ceramic.

In the rolling bearing according to another aspect of the present invention, the rolling elements are made of ceramics. Thus, smearing is suppressed, and the race member and the rolling elements coming into contact with each other are made of different materials, whereby the seizure resistance is improved. Further, ceramics harder than steel is so employed as the material for the rolling elements that the durability of the rolling elements in a contaminated environment is improved. As a result, smearing resistance, and durability in an environment having foreign matters introduced therein are enhanced, and simultaneously, durability in an environment with insufficient lubricity, such as dry-run performance, is enhanced. In addition, the rolling elements are so made of ceramics that reduction in hardness of the rolling elements in a high-temperature environment is suppressed. As the ceramics constituting the rolling elements, silicon nitride, sialon, alumina or zirconia, for example, can be employed.

In the rolling bearing according to another aspect of the present invention, as hereinabove described, the race member is made of the steel containing at least 4 mass % of chromium, and the rolling element is formed of ceramic, whereby reduction in hardness of the bearing components in a high-temperature environment is suppressed. Further, the nitrogen-enriched layer having the total of the carbon concentration and the nitrogen concentration set in the proper range is formed on the surface layer portion of the race member made of the steel having the proper component composition, and the rolling element is formed of ceramic, whereby the durability of the bearing components in a contaminated environment is improved. Furthermore the race member formed of steel in combination with the ceramic rolling element can improve smearing resistance and dry-run performance. Consequently, a rolling bearing capable of attaining not only suppression of reduction in hardness of the bearing components in a high-temperature environment, improvement in durability in a contaminated environment and improvement in smearing resistance but also improvement of the dry-run performance can be provided according to the present invention.

The rolling bearing according to another aspect of the present invention as described above may be employed as a bearing supporting a rotating member which is a main shaft or a member rotating upon rotation of the main shaft to be rotatable with respect to a member adjacent to the rotating member in a gas turbine engine. To such a bearing supporting the rotating member (the main shaft or the member rotating upon rotation of the main shaft) in the gas turbine engine, suppression of reduction in hardness of bearing components in a high temperature environment, improvement of durability in a contaminated environment, improvement in smearing resistance and improvement of dry-run performance are required. Therefore, the rolling bearing according to the present invention capable of attaining not only suppression of reduction in hardness of bearing components in a high-temperature environment, improvement in durability in a contaminated environment and improvement in smearing resistance but also improvement of dry-run performance is suitable as a bearing supporting a rotating member in a gas turbine engine.

Effects of the Invention

As is apparent from the above description, the present invention can thus provide a mechanical component that is formed of steel containing at least 3.75 mass % of chromium, and also has a surface layer portion having a nitrogen enriched layer, and also ensures sufficient fatigue resistance and toughness. Furthermore, the present invention can provide a rolling bearing capable of attaining not only suppression of reduction in hardness of bearing components in a high-temperature environment and improvement in durability in a contaminated environment and improvement in smearing resistance but also improvement of dry-run performance.

DESCRIPTION OF THE REFERENCE SIGNS

1: deep groove ball bearing, 2: thrust needle roller bearing, 3: constant velocity joint, 4: three point contact ball bearing, 5: cylindrical roller bearing, 11: outer ring, 11A: outer ring raceway surface, 11B: outer ring nitrogen-enriched layer, 12: inner ring, 12A: inner ring raceway surface, 12B: inner ring nitrogen-enriched layer, 13: ball, 13A: ball rolling contact surface, 13B: ball nitrogen-enriched layer, 14, 24: cage, 21: bearing washer, 21A: bearing washer raceway surface, 21B: bearing washer nitrogen-enriched layer, 23A: roller rolling contact surface, 23B: roller nitrogen-enriched layer, 31: inner race, 31A: inner race ball groove, 31B: inner race nitrogen-enriched layer, 32: outer race, 32A: outer race ball groove, 32B: outer race nitrogen-enriched layer, 33: ball, 33A: ball rolling contact surface, 33B: ball nitrogen-enriched layer, 34: cage, 35, 36: shaft, 41, 51: outer ring, 41A, 51A: outer ring raceway surface, 41B, 51B: outer ring nitrogen-enriched layer, 42, 52: inner ring, 42A, 52A: inner ring raceway surface, 42B, 52B: inner ring nitrogen-enriched layer, 421: first inner ring, 421A: first inner ring raceway surface, 422: second inner ring, 422A: second inner ring raceway surface, 43: ball, 43A: ball rolling contact surface, 44, 54: cage, 53: roller, 53A: roller rolling contact surface, 70: turbo fan engine, 71: compression portion, 72: combustion portion, 73: turbine portion, 74: low-pressure main shaft, 75: fan, 75A: fan blade, 76: fan nacelle, 77: high-pressure main shaft, 78: core cowl, 79: bypass passage, 81: compressor, 81A: low-pressure compressor, 81B: high-pressure compressor, 82: combustion chamber, 83: turbine, 83A: low-pressure turbine, 83B: high-pressure turbine, 84: turbine nozzle, 87: turbine blade, 88: compressor blade, 89: rolling bearing, 90: grain boundary precipitates.

BEST MODES FOR CARRYING OUT THE INVENTION

Hereinafter reference will be made to the drawings to describe the present invention in embodiments. In the figures, identical or corresponding components are identically denoted and will not be described repeatedly.

First Embodiment

Initially the present invention in a first embodiment will be described.

Figure 1:
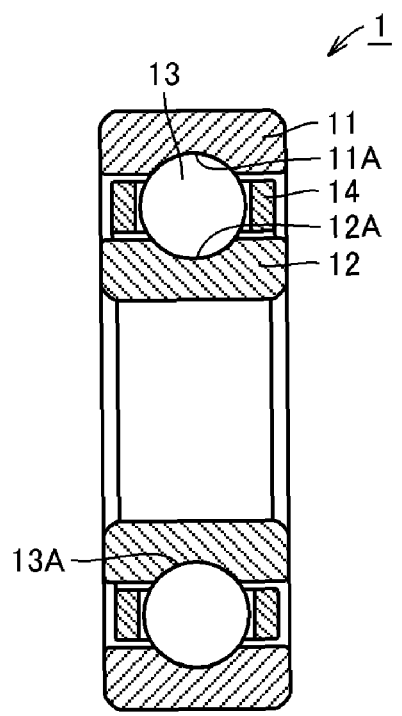
FIG. 1 is a schematic cross section of a configuration of a deep groove ball bearing including a mechanical component in a first embodiment of the present invention.

With reference to FIG. 1, a deep groove ball bearing 1 includes an annular outer ring 11, an annular inner ring 12 arranged to be inner than outer ring 11, and rolling elements implemented as a plurality of balls 13 arranged between outer and inner rings 11 and 12 and held in an annular cage 14. Outer ring 11 has an inner circumferential surface having an outer ring raceway surface 11A and inner ring 12 has an outer circumferential surface having an inner ring raceway surface 12A. Outer ring 11 and inner ring 12 are disposed such that inner ring raceway surface 12A and outer ring raceway surface 11A face each other. The plurality of balls 13 are held in a rollable manner on an annular raceway, with their rolling contact surfaces 13A in contact with inner ring raceway surface 12A and outer ring raceway surface 11A, disposed at a predetermined pitch in the circumferential direction by means of cage 14. By such a configuration, outer ring 11 and inner ring 12 of deep groove ball bearing 1 can be rotated relative to each other.

Figure 2:
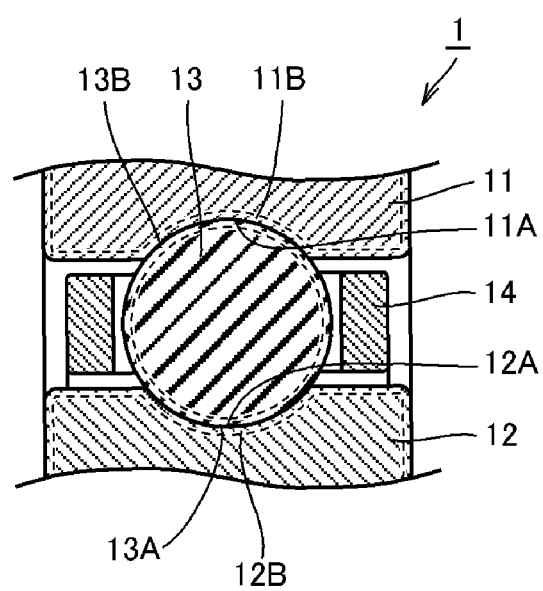
FIG. 2 is an enlarged schematic partial cross section of a principal part of FIG. 1.

Outer ring 11, inner ring 12 and ball 13 serving as mechanical components are made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity. Referring to FIG. 2, an outer ring nitrogen-enriched layer 11B, an inner ring nitrogen-enriched layer 12B and a ball nitrogen-enriched layer 13B having nitrogen concentrations of at least 0.05 mass % are formed on regions including outer ring raceway surface 11A, inner ring raceway surface 12A and ball rolling contact surface 13A which are the surfaces of outer ring 11, inner ring 12 and ball 13. Further, the totals of carbon concentrations and the nitrogen concentrations in outer ring nitrogen-enriched layer 11B, inner ring nitrogen-enriched layer 12B and ball nitrogen-enriched layer 13B are at least 0.82 mass % and not more than 1.9 mass %. The aforementioned impurity includes unavoidable impurity such as that derived from the raw materials for the steel, that mixed in production steps and the like.

Outer ring 11, inner ring 12 and ball 13 serving as the mechanical components according to the present embodiment are made of the steel having the aforementioned proper component composition, and outer ring nitrogen-enriched layer 11B, inner ring nitrogen-enriched layer 12B and ball nitrogen-enriched layer 13B having the nitrogen concentrations of at least 0.05 mass % are formed on the regions including outer ring raceway surface 11A, inner ring raceway surface 12A and ball rolling contact surface 13A formed on the surfaces thereof. The totals of the carbon concentrations and the nitrogen concentrations in outer ring nitrogen-enriched layer 11B, inner ring nitrogen-enriched layer 12B and ball nitrogen-enriched layer 13B are so set in the proper range of at least 0.82 mass % and not more than 1.9 mass % that sufficient hardness is supplied to surface layer portions thereof and formation of grain boundary precipitates is suppressed. Consequently, outer ring 11, inner ring 12 and ball 13 serving as the mechanical components in the present embodiment are made of steel containing at least 3.75 mass % of chromium and provided with nitrogen-enriched layers on the surface layer portions thereof, while sufficiently ensuring fatigue resistance and toughness. Furthermore, outer ring 11, inner ring 12 and ball 13 allow a rolling bearing implemented as deep groove ball bearing 1 to have a long life.

Preferably, the thicknesses of outer ring nitrogen-enriched layer 11B, inner ring nitrogen-enriched layer 12B and ball nitrogen-enriched layer 13B formed on outer ring 11, inner ring 12 and ball 13 are at least 0.11 mm. Thus, sufficient strength is supplied to outer ring 11, inner ring 12 and ball 13.

Preferably, outer ring nitrogen-enriched layer 11B, inner ring nitrogen-enriched layer 12B and ball nitrogen-enriched layer 13B have hardness of at least 830 HV. Thus, the strength of outer ring 11, inner ring 12 and ball 13 can be more reliably ensured.

Preferably, the number of nitrides of iron each having an aspect ratio of at least 2 and a length of at least 7.5 µm is not more than one in five fields of view of square regions of 150 µm on each side when outer ring nitrogen-enriched layer 11B, inner ring nitrogen-enriched layer 12B and ball nitrogen-enriched layer 13B are observed with a microscope. Thus, the fatigue resistance of outer ring 11, inner ring 12 and ball 13 can be improved.

Hereinafter reference will be made to FIG. 3 and FIG. 4 to describe a thrust needle roller bearing in a first exemplary variation of the present embodiment.

Figure 3:
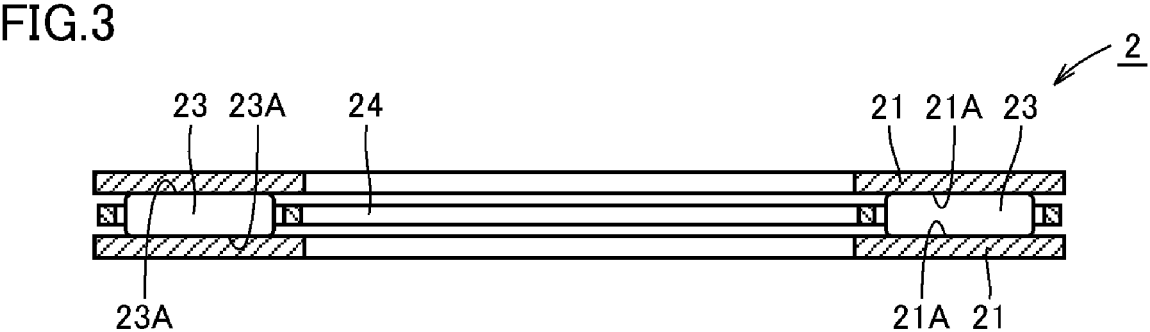
FIG. 3 is a schematic cross section of a configuration of a thrust needle roller bearing including a mechanical component in a first exemplary variation.

With reference to FIG. 3, thrust needle roller bearing 2 includes a pair of bearing washers 21 in the form of a disk, serving as a rolling contact member arranged such that their respective, one main surfaces face each other, a plurality of needle rollers 23 serving as a rolling contact member, and an annular cage 24. The plurality of needle rollers 23 are held in a rollable manner on an annular raceway, with their outer circumferential surfaces i.e., a roller rolling contact surface 23A, in contact with bearing washer raceway surface 21A formed at the main surfaces of the pair of bearing washers 21 facing each other, disposed at a predetermined pitch in the circumferential direction by means of cage 24. By such a configuration, the pair of bearing washers 21 of thrust needle roller bearing 2 can be rotated relative to each other.

Figure 4:
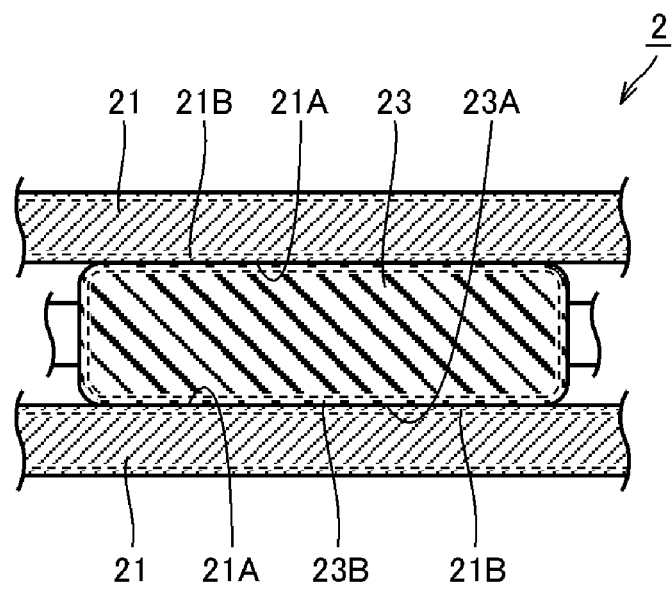
FIG. 4 is an enlarged schematic partial cross section of a principal part of FIG. 3.

Herein, with reference to FIG. 4, in the present exemplary variation, bearing washer 21 and needle roller 23 of thrust needle roller bearing 2 correspond to outer and inner rings 11 and 12 and ball 13 of deep groove ball bearing 1, respectively, and the former is similar to the latter in configuration and effect. More specifically, bearing washer 21 and needle roller 23 serving as the mechanical components are made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity. Referring to FIG. 4, a bearing washer nitrogen-enriched layer 21B and a roller nitrogen-enriched layer 23B having nitrogen concentrations of at least 0.05 mass % are formed on regions including bearing washer raceway surface 21A and roller rolling contact surface 23A which are the surfaces of bearing washer 21 and needle roller 23. Further, the totals of carbon concentrations and the nitrogen concentrations in bearing washer nitrogen-enriched layer 21B and roller nitrogen-enriched layer 23B are at least 0.82 mass % and not more than 1.9 mass %.

Bearing washer 21 and needle roller 23 serving as the mechanical components in the present exemplary variation are made of the steel having the aforementioned proper component composition, and bearing washer nitrogen-enriched layer 21B and roller nitrogen-enriched layer 23B having the nitrogen concentrations of at least 0.05 mass % are formed on the regions including bearing washer raceway surface 21A and roller rolling contact surface 23A formed on the surfaces thereof. The totals of the carbon concentrations and the nitrogen concentrations in bearing washer nitrogen-enriched layer 21B and roller nitrogen-enriched layer 23B are so set in the proper range of at least 0.82 mass % and not more than 1.9 mass % that sufficient hardness is supplied to surface layer portions thereof and formation of grain boundary precipitates is suppressed. Consequently, bearing washer 21 and needle roller 23 serving as the mechanical components in the present exemplary variation are made of steel containing at least 3.75 mass % of chromium and provided with nitrogen-enriched layers on the surface layer portions thereof, while sufficiently ensuring fatigue resistance and toughness.

Furthermore, bearing washer 21 and needle roller 23 allow a rolling bearing implemented as thrust needle roller bearing 2 to have a long life.

Figure 5:
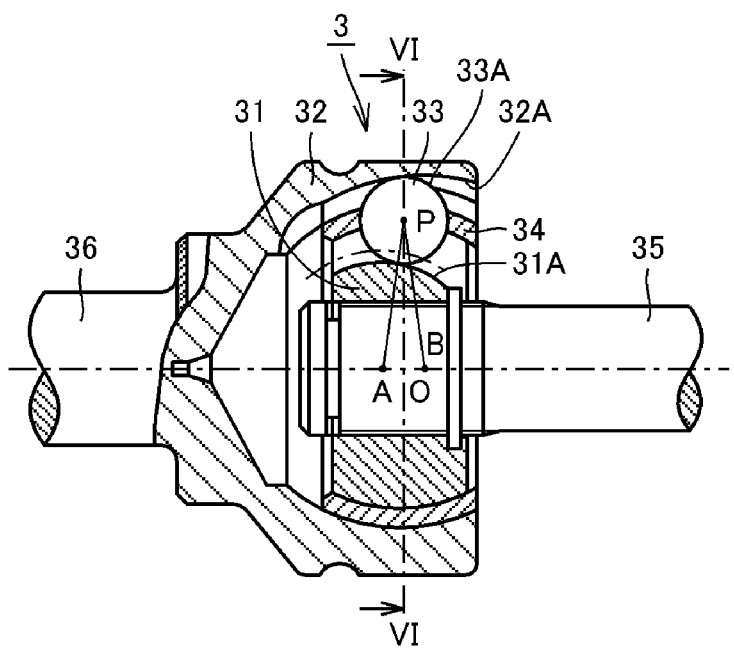
FIG. 5 is a schematic cross section of a configuration of a constant velocity joint including a mechanical component in a second exemplary variation.
Figure 6:
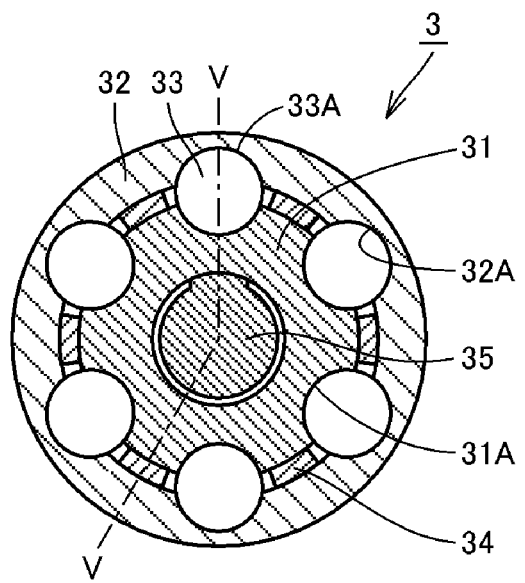
FIG. 6 is a schematic cross section taken along a line VI-VI shown in FIG. 5.

With reference to FIG. 5 to FIG. 9, the present embodiment in a second exemplary variation provides a constant velocity joint, as will be described hereinafter. With reference to FIG. 5 and FIG. 6, a constant velocity joint 3 includes an inner race 31 coupled to a shaft 35, an outer race 32 arranged to surround the outer circumferential side of inner race 31 and coupled to a shaft 36, a torque transmitting ball 33 arranged between inner race 31 and outer race 32, and a cage 34 holding ball 33. Ball 33 is arranged with ball rolling contact surface 33A in contact with an inner race ball groove 31A formed at the outer circumferential surface of inner race 31 and an outer race ball groove 32A formed at the inner circumferential surface of outer race 32, and is held by cage 34 to avoid falling off.

As shown in FIG. 3, inner race ball groove 31A and outer race ball groove 32A located at the outer circumferential surface of inner race 31 and the inner circumferential surface of outer race 32, respectively, are formed in a curve (arc) with points A and B equally spaced apart at the left and right on the axis passing through the center of shafts 35 and 36 in a straight line from the joint center O on the axis as the center of curvature. In other words, inner race ball groove 31A and outer race ball groove 32A are formed such that the trajectory of center P of ball 33 that rolls in contact with inner race ball groove 31A and outer race ball groove 32A corresponds to a curve (arc) with point A (inner race center A) and point B (outer race center B) as the center of curvature. Accordingly, ball 33 is constantly located on the bisector of an angle (∠AOB) with respect to the axis passing through the center of shafts 35 and 36 even when the constant velocity joint forms an angle (when the constant velocity joint operates such that the axes passing through the center of shafts 35 and 36 cross).

Figure 7:
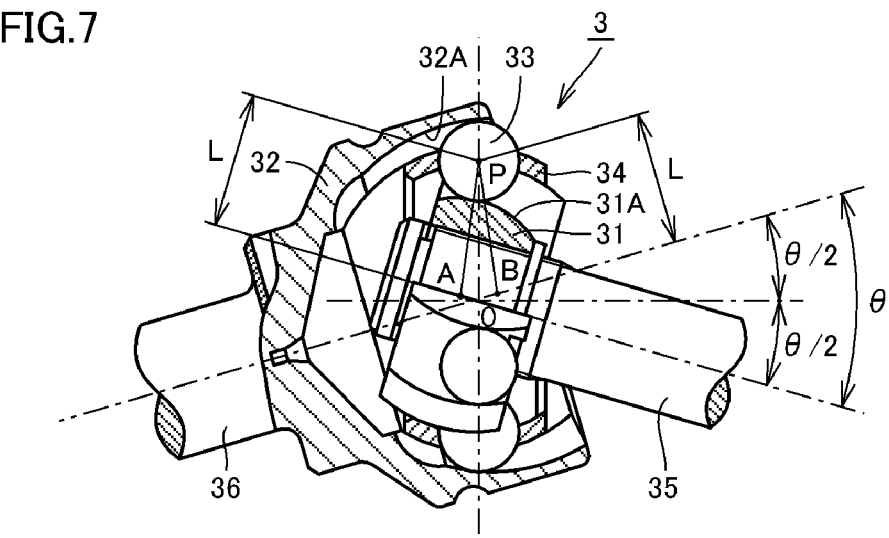
FIG. 7 is a schematic cross section of the FIG. 5 constant velocity joint forming an angle.

Constant velocity joint 3 operates, as will be described hereinafter. With reference to FIG. 5 and FIG. 6, when the rotation about the axis is transmitted to one of shafts 35 and 36 at constant velocity joint 3, this rotation is transmitted to the other of shafts 35 and 36 via ball 33 fitted in inner race ball groove 31A and outer race ball groove 32A. In the case where shafts 35 and 36 form an angle θ as shown in FIG. 7, ball 33 is guided by inner race ball groove 31A and outer race ball groove 32A with inner race center A and outer race center B as the center of curvature to be held at a position where its center P is located on the bisector of ∠AOB. Since inner race ball groove 31A and outer race ball groove 32A are formed such that the distance from joint center O to inner race center A is equal to the distance from joint center O to outer race center B, the distance from center P of ball 33 to respective inner race center A and outer race center B is equal. Thus, triangle OAP is congruent to triangle OBP. As a result, the distances L from center P of ball 33 to shafts 35 and 36 are equal to each other, and when one of shafts 35 and 36 rotates about the axis, the other also rotates at constant velocity. Thus, constant velocity joint 3 can ensure constant velocity even in the state where shafts 35 and 36 constitute an angle. Cage 34 serves, together with inner race ball groove 31A and outer race ball groove 32A, to prevent ball 33 from jumping out of inner race ball groove 31A and outer race ball groove 32A when shafts 35 and 36 rotate, and also serves to determine joint center O of constant velocity joint 3.

Figure 8:
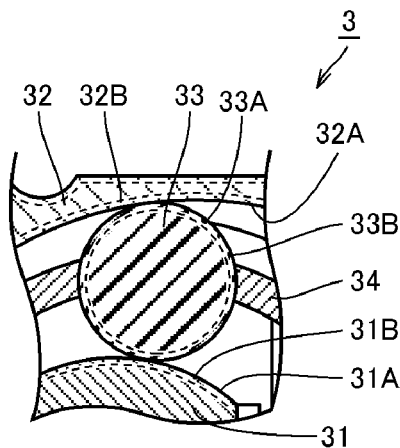
FIG. 8 is an enlarged schematic partial cross section of a principal part of FIG. 5.
Figure 9:
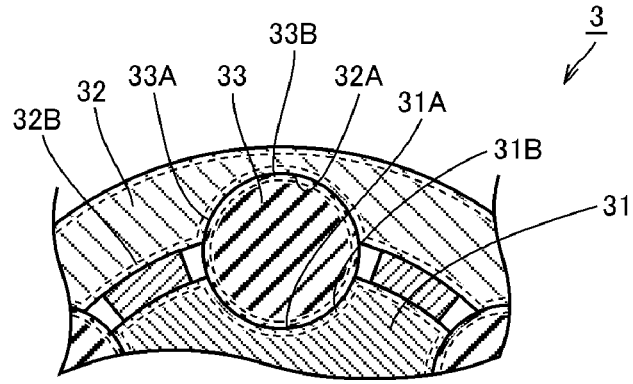
FIG. 9 is an enlarged schematic partial cross section of a principal part of FIG. 6.

Herein, in the present exemplary variation, inner and outer races 31 and 32 and ball 33 of constant velocity joint 3 correspond to outer and inner rings 11 and 12 and ball 13 of deep groove ball bearing 1, respectively, and the former is similar to the latter in configuration and effect. More specifically, inner and outer races 31 and 32 and ball 33 serving as the mechanical components are made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity. Referring to FIG. 8 and FIG. 9, an inner race nitrogen-enriched layer 31B, an outer race nitrogen-enriched layer 32B, and a ball nitrogen-enriched layer 33B having nitrogen concentrations of at least 0.05 mass % are formed on regions including a surface of inner race ball groove 31A, a surface of outer race ball groove 32A, and ball rolling contact surface 33A which are the surfaces of inner and outer races 31 and 32 and ball 33. Further, the totals of carbon concentrations and the nitrogen concentrations in inner race nitrogen-enriched layer 31B, outer race nitrogen-enriched layer 32B, and ball nitrogen-enriched layer 33B are at least 0.82 mass % and not more than 1.9 mass %.

Inner and outer races 31 and 32 and ball 33 serving as the mechanical components in the present exemplary variation are made of the steel having the aforementioned proper component composition, and inner race nitrogen-enriched layer 31B, outer race nitrogen-enriched layer 32B, and ball nitrogen-enriched layer 33B having the nitrogen concentrations of at least 0.05 mass % are formed on the regions including a surface of inner race ball groove 31A, a surface of outer race ball groove 32A, and ball rolling contact surface 33A formed on the surfaces thereof. The totals of the carbon concentrations and the nitrogen concentrations in inner race nitrogen-enriched layer 31B, outer race nitrogen-enriched layer 32B, and ball nitrogen-enriched layer 33B are so set in the proper range of at least 0.82 mass % and not more than 1.9 mass % that sufficient hardness is supplied to surface layer portions thereof and formation of grain boundary precipitates is suppressed. Consequently, inner and outer races 31 and 32 and ball 33 serving as the mechanical components in the present exemplary variation are made of steel containing at least 3.75 mass % of chromium and provided with nitrogen-enriched layers on the surface layer portions thereof, while sufficiently ensuring fatigue resistance and toughness. Furthermore, inner and outer races 31 and 32 and ball 33 allow a universal joint implemented as constant velocity joint 3 to have a long life.

A method of producing a mechanical component, and a rolling bearing, a constant velocity joint and the like mechanical element including the mechanical component according to the first embodiment will now be described.

Figure 10:
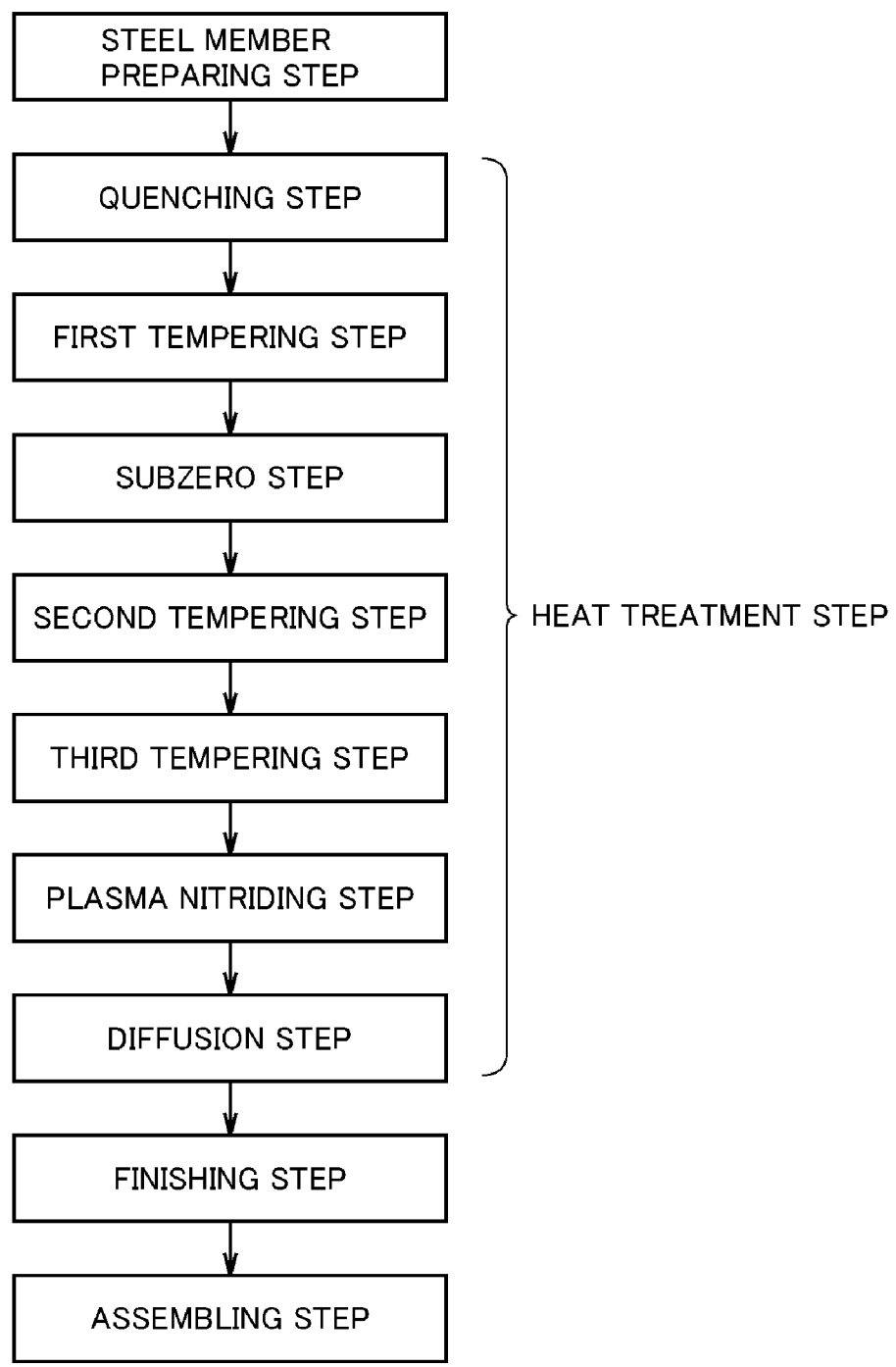
FIG. 10 generally illustrates a method of producing the mechanical component and a method of producing a mechanical element including the mechanical component in the first embodiment.

Referring to FIG. 10, first, steel members made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity, and formed into substantial shapes of mechanical components are prepared, i.e., a steel member preparing step is carried out. More specifically, working operations such as cutting, forging and turning are performed on steel bars or steel wires containing the aforementioned components, thereby preparing steel members formed into substantial shapes of the mechanical components such as outer ring 11, bearing washer 21, inner race 31 and the like as the mechanical components.

Then, a heat treatment step is carried out by performing a heat treatment including quenching and nitriding the aforementioned steel members prepared in the steel member preparing step. The details of this heat treatment step will be described later.

Then, a finishing step performing finishing etc. on the steel members subjected to the heat treatment step is carried out.

More specifically, inner ring raceway surface 12A, bearing washer raceway surface 21A, outer race ball groove 32A and the like of the steel members subjected to the heat treatment step are polished, for example. This completes a mechanical component in the present embodiment and the method of producing the mechanical component in the present embodiment is completed.

Furthermore, the assembling step of assembling the completed mechanical components into a mechanical element is carried out. More specifically, the mechanical components of the present invention produced through the aforementioned steps, i.e., outer ring 11, inner ring 12, balls 13 and cage 14, for example, are assembled into deep groove ball bearing 1. Thus, a mechanical element including a mechanical component of the present invention is produced.

Figure 11:
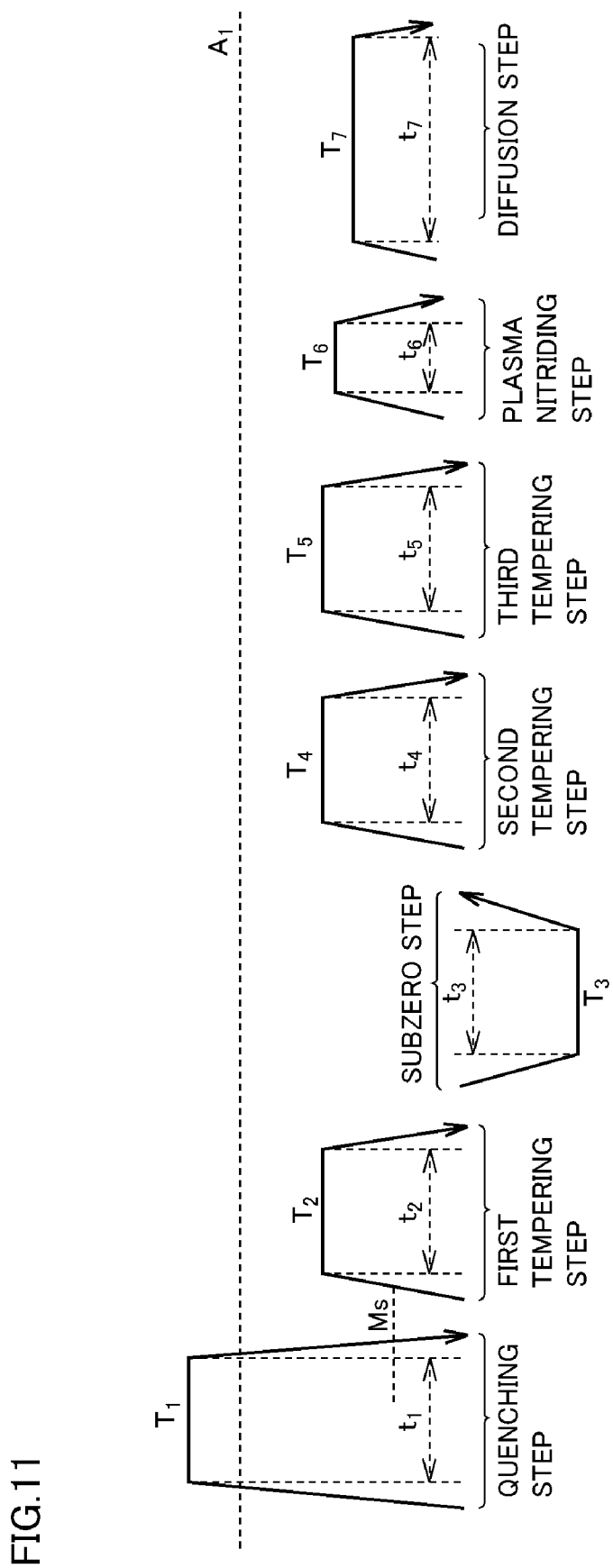
FIG. 11 is a diagram for illustrating the details of a heat treatment step included in the method of producing the mechanical component.

The details of the aforementioned heat treatment step will now be described with reference to FIG. 11. Referring to FIG. 11, time shown in the horizontal direction elapses rightward. Referring to FIG. 11, further, temperature shown in the vertical direction is increased upward.

Referring to FIG. 11, the quenching step of quenching the steel members as the objects to be treated is first carried out in the heat treatment step of the method of producing a mechanical component according to the present embodiment. More specifically, the steel members are heated to a temperature $T_1$ equal to or higher than a transformation temperature $A_1$ in a decompressed atmosphere (vacuum) or a salt bath, maintained at this temperature for a time $t_1$, and thereafter cooled from the temperature $T_1$ equal to or higher than the transformation temperature $A_1$ to a temperature equal to or lower than a point $M_s$, to be quenched.

The transformation temperature $A_1$ denotes a point corresponding to a temperature at which the structure of the steel starts transforming from ferrite into austenite when the same is heated. The point $M_s$ denotes a point corresponding to a temperature at which the steel having transformed into austenite starts transforming into martensite when the same is cooled.

Then, the first tempering step is carried out for tempering the steel members subjected to the quenching. More specifically, the steel members are heated to a temperature $T_2$ less than the transformation temperature $A_1$ in a vacuum, maintained at this temperature for a time $t_2$, and thereafter cooled, to be tempered, for example. Thus, residual stress resulting from the quenching of the steel members is relaxed, and strain resulting from the heat treatment is suppressed.

Then, the subzero step is carried out on the steel members subjected to the first tempering step. More specifically, a subzero treatment is performed by spraying liquid nitrogen, for example, onto the steel members for cooling the steel members to a temperature $T_3$ less than 0° C. and maintaining the same at this temperature for a time $t_3$.

Thus, retained austenite formed by the quenching of the steel members transforms into martensite, for stabilizing the structure of the steel.

Then, the second tempering step is carried out on the steel members subjected to the subzero step. More specifically, the steel members are heated to a temperature $T_4$ less than the transformation temperature $A_1$ in a vacuum, maintained at this temperature for a time $t_4$, and thereafter cooled, to be tempered, for example. Thus, residual stress resulting from the subzero treatment of the steel members is relaxed, and strain is suppressed.

Then, the steel members subjected to the second tempering step are tempered again through the third tempering step. More specifically, the steel members are heated to a temperature $T_5$ less than the transformation temperature $A_1$ in a vacuum, maintained at this temperature for a time $t_5$, and thereafter cooled, to be tempered similarly to the aforementioned second tempering step, for example. The temperature $T_5$ and the time $t_5$ can be set similarly to the temperature $T_4$ and the time $t_4$ in the second tempering step respectively. Thus, residual stress resulting from the subzero treatment of the steel members is relaxed and strain is suppressed, similarly to the second tempering step. The second and third tempering steps may be carried out as a single step.

Then, the plasma nitriding step is carried out on the steel members subjected to the third tempering step. More specifically, the steel members are inserted into a plasma nitriding furnace into which nitrogen ($N_2$) and at least one element selected from the group consisting of hydrogen ($H_2$), methane ($CH_4$) and argon (Ar) are introduced so that the pressure is at least 50 Pa and not more than 5000 Pa, and the steel members are heated to a temperature $T_6$ under conditions of a discharge voltage of at least 50 V and not more than 1000 V and a discharge current of at least 0.001 A and not more than 100 A, maintained at this temperature for a time $t_6$, and thereafter cooled, to be plasma-nitrided, for example. Thus, nitrogen penetrates into the surface layer portions of the steel members to form nitrogen-enriched layers, thereby improving the strength of the surface layer portions. The temperature $T_6$ can be set to at least 300° C. and not more than 550° C., for example, and the time $t_6$ can be set to at least one hour and not more than 80 hours. The heat treatment conditions such as the temperature $T_6$ and the time $t_6$ can be so decided that grain boundary precipitate layers formed in the plasma nitriding treatment have such thicknesses that the grain boundary precipitate layers can be removed in the finishing step in consideration of removal amounts in the finishing performed in the finishing step.

When the steel constituting the steel members is AMS 6490 (AISI M50), the pressure, the discharge voltage, the discharge current, the temperature $T_6$ and the time $t_6$ in the plasma nitriding step are preferably set to at least 50 Pa and not more than 1000 Pa, at least 50 V and not more than 600 V, at least 0.001 A and not more than 300 A, at least 350° C. and not more than 450° C. and at least one hour and not more than 50 hours respectively.

Then, the diffusion step is carried out on the steel members subjected to the plasma nitriding step. More specifically, the steel members are heated to a temperature $T_7$ in a vacuum and maintained at this temperature for a time $t_7$ to be diffusion-treated, for example. The temperature $T_7$ can be set to at least 300° C. and not more than 480° C., preferably at least 300° C. and not more than 430° C., and the time $t_7$ can be set to at least 50 hours and not more than 300 hours. Thus, the nitrogen having penetrated into the steel can be made to reach desired regions while suppressing cancellation of increase in the hardness of the surface layer portions resulting from formation of nitrided layers. The diffusions step is so carried out that the nitrogen having penetrated into the steel can be made to reach the desired regions even if the depths of the penetration of the nitrogen in the plasma nitriding step are kept in the range allowing removal of the grain boundary precipitate layers in the finishing. The heat treatment step in the present embodiment is completed through these steps.

According to the heat treatment method for steel in the present embodiment, as hereinabove described, hard nitrogen-enriched layers can be formed by nitriding the surface layer portions of the steel containing at least 3.75 mass % of chromium, and formation of grain boundary precipitates can be suppressed by the diffusion step.

According to the method of producing a mechanical component in the above embodiment, mechanical components (outer ring 11, bearing washer 21, inner race 31 etc.) made of steel containing at least 3.75 mass % of chromium, provided with hard nitrogen-enriched layers by nitriding surface layer portions and inhibited from formation of grain boundary precipitates can be produced. Consequently, the nitrogen-enriched layers having the nitrogen concentrations of at least 0.05 mass %, the totals of the carbon concentrations and the nitrogen concentrations of at least 0.82 mass % and not more than 1.9 mass %, the thicknesses of at least 0.11 mm and the hardness of at least 830 HV are formed on the regions including the surfaces (outer ring raceway surface 11A, bearing washer raceway surface 21A, a surface of inner race ball groove 31A etc.) of the mechanical components (outer ring 11, bearing washer 21, inner race 31 etc.) in the present embodiment as hereinabove described, while the number of detected grain boundary precipitates can be reduced to not more than one when each nitrogen-enriched layer is cut along a cross section perpendicular to the surface thereof and the cross section is observed with an optical microscope or an SEM randomly in five fields of view each of a square region including the surface and having each side of 150 μm. The carbon concentration and the nitrogen concentration in each nitrogen-enriched layer can be controlled by adjusting the treatment time of the plasma nitriding performed in the plasma nitriding step and the treating time of the diffusion treatment performed in the diffusion step, for example.

Second Embodiment

Figure 12:
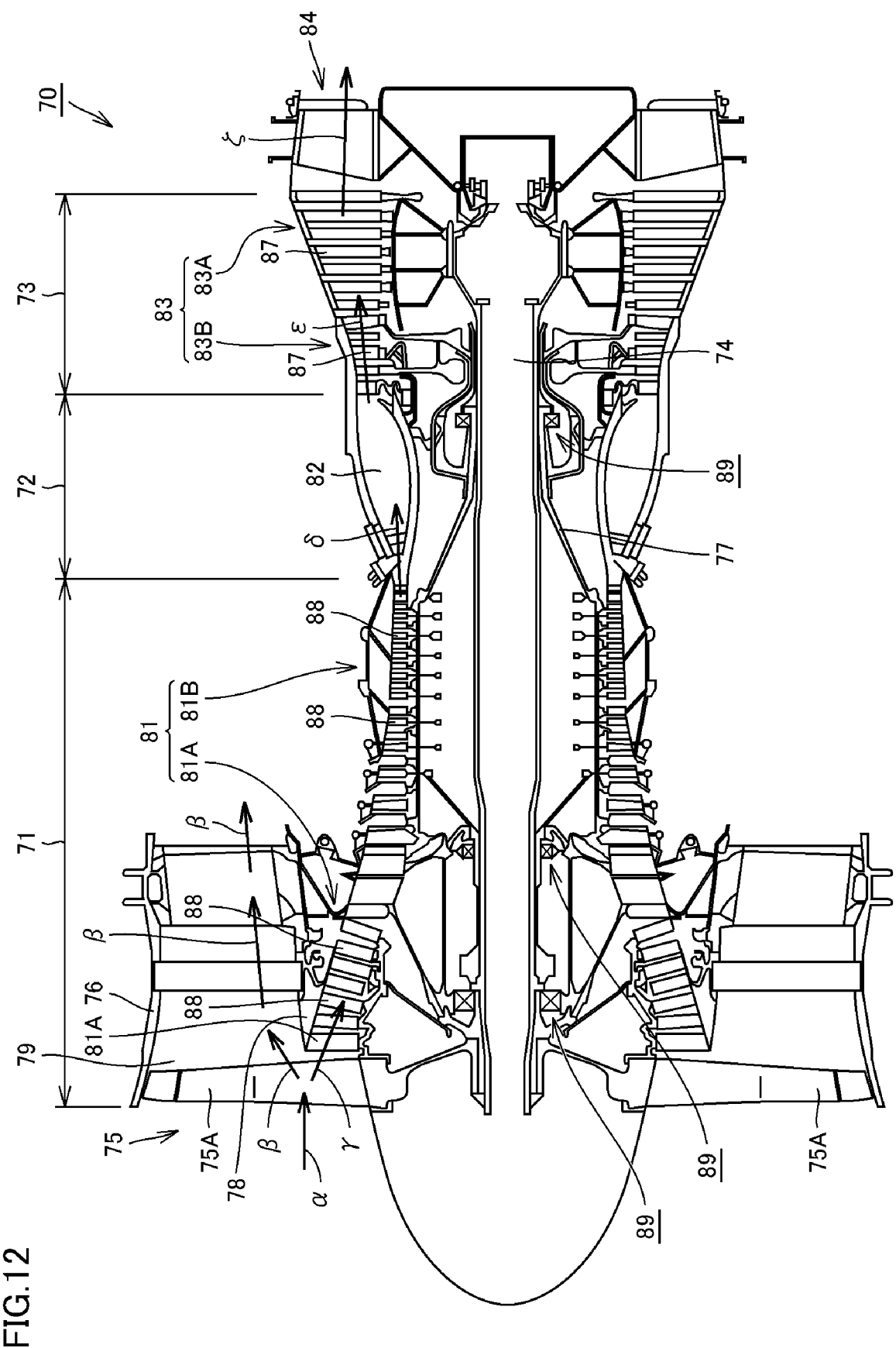
FIG. 12 is a schematic diagram showing the structure of a turbofan engine to which a rolling bearing of the present invention is applicable.

With reference to FIG. 12, the present invention in a second embodiment provides a turbo fan engine configured, as will be described hereinafter.

Referring to FIG. 12, a turbofan engine 70 includes a compression portion 71, a combustion portion 72 and a turbine portion 73. Turbofan engine 70 further includes a low-pressure main shaft 74 so arranged as to reach turbine portion 73 from compression portion 71 through combustion portion 72 and a high-pressure main shaft 77 so arranged as to enclose the outer circumferential surface of low-pressure main shaft 74.

Compression portion 71 includes a fan 75 having a plurality of fan blades 75A connected to low-pressure main shaft 74 and so formed as to radially outwardly protrude from low-pressure main shaft 74, a fan nacelle 76 enclosing the outer peripheral side of fan 75 and extending toward combustion portion 72 and a compressor 81 arranged on the side closer to combustion portion 72 as viewed from fan 75. Compressor 81 has a low-pressure compressor 81A and a high-pressure compressor 81B arranged on the side closer to combustion portion 72 as viewed from low-pressure compressor 81A. Low-pressure compressor 81A has a plurality of compressor blades 88 connected to low-pressure main shaft 74 to radially outwardly protrude from low-pressure main shaft 74 and arranged in line in a direction for approaching combustion portion 72 from the side of fan 75. High-pressure compressor 81B also has a plurality of compressor blades 88 connected to high-pressure main shaft 77 to radially outwardly protrude from high-pressure main shaft 77 and arranged in line in the direction for approaching combustion portion 72 from the side of fan 75. Further, a core cowl 78 is so arranged as to enclose the outer peripheral side of low-pressure compressor 81A. An annular space between core cowl 78 and fan nacelle 76 constitutes a bypass passage 79.

Combustion portion 72 includes a combustion chamber 82 connected to high-pressure compressor 81B of compression portion 71 and provided with a fuel supply member and an ignition member (not shown). Turbine portion 73 includes a turbine 83 having a high-pressure turbine 83B and a low-pressure turbine 83A arranged on a side opposite to combustion portion 72 as viewed from high-pressure turbine 83B. Further, a turbine nozzle 84 externally discharging combustion gas from turbine 83 is arranged on a side opposite to high-pressure turbine 83B as viewed from low-pressure turbine 83A. Low-pressure turbine 83A has a plurality of turbine blades 87 connected to low-pressure main shaft 74 to radially outwardly protrude from low-pressure main shaft 74 and arranged in line in a direction for approaching turbine nozzle 84 from the side of combustion chamber 82. High-pressure turbine 83B also has a plurality of turbine blades 87 connected to high-pressure main shaft 77 to radially outwardly protrude from high-pressure main shaft 77 and arranged in line in the direction for approaching turbine nozzle 84 from the side of combustion chamber 82.

Low-pressure main shaft 74 and high-pressure main shaft 77 as rotating members which are main shafts or members rotating upon rotation of the main shafts are supported by rolling bearings 89 to be rotatable with respect to members arranged adjacently to low-pressure main shaft 74 and high-pressure main shaft 77. In other words, rolling bearing 89 is provided in turbofan engine 70 serving as a gas turbine engine and supports low-pressure main shaft 74 or high-pressure main shaft 77 as the rotating member which is the main shaft or the member rotating upon rotation of the main shaft to be rotatable with respect to the member adjacent to low-pressure main shaft 74 or high-pressure main shaft 77.

Operations of turbofan engine 70 according to the present embodiment will now be described. Referring to FIG. 12, air on the side opposite to combustion portion 72 as viewed from fan 75, i.e., on the front side of turbofan engine 70 is incorporated into the space enclosed with fan nacelle 76 by fan 75 rotating around the axis of low-pressure main shaft 74 (arrow α). Part of the incorporated air flows along arrow β, and is externally discharged as an air jet through bypass passage 79. This air jet partially forms a part of the thrust generated by turbofan engine 70.

On the other hand, the rest of the air incorporated into the space enclosed with fan nacelle 76 flows into compressor 81 along arrow γ. The air flowing into compressor 81 is compressed by flowing toward high-pressure compressor 81B through low-pressure compressor 81A having the plurality of compressor blades 88 rotating around the axis of low-pressure main shaft 74, and flows into high-pressure compressor 81B. The air flowing into high-pressure compressor 81B is further compressed by flowing toward combustion chamber 82 through high-pressure compressor 81B having the plurality of compressor blades 88 rotating around the axis of high-pressure main shaft 77, and flows into combustion chamber 82 (arrow δ).

The air compressed in compressor 81 to flow into combustion chamber 82 is mixed with a fuel supplied into combustion chamber 82 by the fuel supply member (not shown), and ignited by the ignition member (not shown). Thus, combustion gas is generated in combustion chamber 82. This combustion gas flows out of combustion chamber 82, to flow into turbine 83 (arrow ε).

The combustion gas flowing into turbine 83 collides with turbine blades 87 connected to high-pressure main shaft 77 in high-pressure turbine 83B, thereby rotating high-pressure main shaft 77 around the axis. Thus, high-pressure compressor 81B having compressor blades 88 connected to high-pressure main shaft 77 is driven. Further, the combustion gas passing through high-pressure turbine 83B collides with turbine blades 87 connected to low-pressure main shaft 74 in low-pressure turbine 83A, thereby rotating low-pressure main shaft 74 around the axis. Thus, low-pressure compressor 81A having compressor blades 88 connected to low-pressure main shaft 74 and fan 75 having fan blades 75A connected to low-pressure main shaft 74 are driven.

The combustion gas passing through low-pressure turbine 83A is externally discharged from turbine nozzle 84. The discharged combustion gas jetted forms a part of the thrust generated by turbofan engine 70.

In turbofan engine 70, rolling bearing 89 supporting low-pressure main shaft 74 or high-pressure main shaft 77 to be rotatable with respect to the member adjacent to low-pressure main shaft 74 or high-pressure main shaft 77 is used in a high-temperature environment due to influence by heat generated in turbofan engine 70. Further, hard foreign matter such as metallic powder or carbon powder may penetrate into rolling bearing 89. Therefore, suppression of reduction in hardness of bearing components in the high-temperature environment and improvement in durability in a contaminated environment are required to rolling bearing 89. Furthermore, smearing must be reduced/prevented to support rapid rotation of low-pressure main shaft 74 or high-pressure main shaft 77. Further, dry-run performance is also required to rolling bearing 89 so that, even if lubrication of rolling bearing 89 is temporarily stopped by some cause when turbofan engine 70 is installed in an aircraft, rolling bearing 89 continuously rotatably supports low-pressure main shaft 74 or high-pressure main shaft 77 without seizure until the lubrication is recovered.

When rolling bearing 89 is formed by a rolling bearing according to the second embodiment of the present invention described below, the aforementioned requirements can be satisfied.

Figure 13:
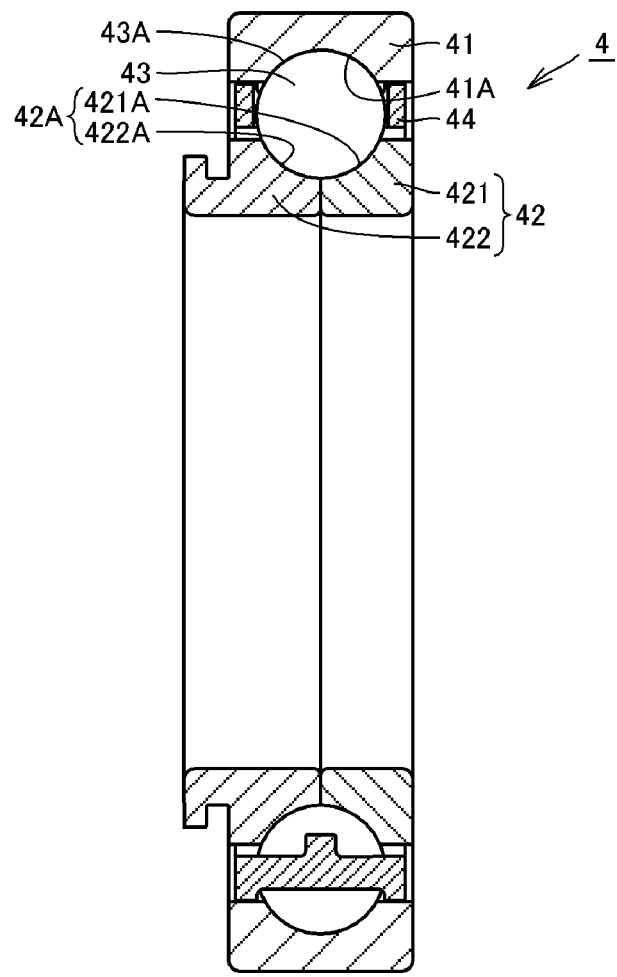
FIG. 13 is a schematic cross section of the structure of a three-point contact ball bearing.

Referring to FIG. 13, a three-point contact ball bearing 4 is basically similar in configuration and effect to deep groove ball bearing 1 in the first embodiment. More specifically, three-point contact ball bearing 4 includes an annular outer ring 41 serving as a race member, an annular inner ring 42 serving as a race member arranged inside outer ring 41, and a plurality of balls 43 as rolling elements arranged between outer ring 41 and inner ring 42 and retained in an annular cage 44. An outer ring raceway surface 41A is formed on the inner circumferential surface of outer ring 41, while an inner ring raceway surface 42A is formed on the outer circumferential surface of inner ring 42. Outer ring 41 and inner ring 42 are so arranged that inner ring raceway surface 42A and outer ring raceway surface 41A are opposed to each other. Inner ring 42 includes a first inner ring 421 and a second inner ring 422, and is divided along the axial center. A first inner ring raceway surface 421A and a second inner ring raceway surface 422A are formed on the outer circumferential surfaces of first inner ring 421 and second inner ring 422 respectively. First inner ring raceway surface 421A and second inner ring raceway surface 422A constitute inner ring raceway surface 42A. The plurality of balls 43 are contactable with first inner ring raceway surface 421A, second inner ring raceway surface 422A and outer ring raceway surface 41A on ball rolling contact surfaces 43A which are the outer circumferential surfaces thereof, and arranged at a prescribed pitch circumferentially by cage 44, to be retained on an annular raceway in a rollable manner. Outer ring 41 and inner ring 42 of three-point contact ball bearing 4 are mutually relatively rotatable due to the aforementioned structure.

Outer ring 41 and inner ring 42 serving as the race members are made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity. Referring to FIG. 13, an outer ring nitrogen-enriched layer 41B and an inner ring nitrogen-enriched layer 42B having nitrogen concentrations of at least 0.05 mass % are formed on regions including outer ring raceway surface 41A and inner ring raceway surface 42A which are the surfaces of outer ring 41 and inner ring 42. Further, the totals of carbon concentrations and the nitrogen concentrations in outer ring nitrogen-enriched layer 41B and inner ring nitrogen-enriched layer 42B are at least 0.82 mass % and not more than 1.9 mass %. The aforementioned impurity includes unavoidable impurity such as that derived from the raw materials for the steel, that mixed in production steps and the like.

Balls 43 serving as the rolling elements are made of ceramics. More specifically, balls 43 are formed by sintered bodies mainly composed of silicon nitride with a remainder consisting of impurity in the present embodiment. The sintered bodies may contain a sintering additive such as aluminum oxide ($Al_2O_3$) or yttrium oxide ($Y_2O_3$).

Outer ring 41 and inner ring 42 serving as the race members of three-point contact ball bearing 4 according to the present embodiment are made of the steel having the aforementioned proper component composition, and outer ring nitrogen-enriched layer 41B and inner ring nitrogen-enriched layer 42B having the nitrogen concentrations of at least 0.05 mass % are formed on the regions including outer ring raceway surface 41A and inner ring raceway surface 42A formed on the surfaces thereof. The totals of the carbon concentrations and the nitrogen concentrations in outer ring nitrogen-enriched layer 41B and inner ring nitrogen-enriched layer 42B are so set in the proper range of at least 0.82 mass % and not more than 1.9 mass % that sufficient hardness is supplied to surface layer portions thereof and formation of grain boundary precipitates is suppressed. Consequently, outer ring 41 and inner ring 42 serving as the race members in the present embodiment are made of steel containing at least 3.75 mass % of chromium and provided with nitrogen-enriched layers on the surface layer portions thereof, while sufficiently ensuring fatigue resistance and toughness.

In three-point contact ball bearing 4 according to the present embodiment, balls 43 serving as the rolling elements are made of ceramics. Thus, smearing is reduced/prevented, and furthermore, as outer and inner rings 41 and 42 and balls 43 coming into contact with each other are made of different materials, the seizure resistance is improved. Consequently, smearing resistance, and simultaneously, endurance in an insufficiently lubricated environment, such as dry-run performance, are improved. The ceramics having higher hardness than the steel is employed as the material for balls 43, whereby durability of balls 43 is improved in a contaminated environment. Further, balls 43 are so made of the ceramics that reduction in hardness of balls 43 in a high-temperature environment is suppressed. In addition, balls 43 are so made of the ceramics that the weights of balls 43 as well as centrifugal force acting on balls 43 are reduced as compared with a case where balls 43 are made of steel, whereby three-point contact ball bearing 4 is suitable as a rolling bearing supporting a member rotating at a high speed, in particular.

In three-point contact ball bearing 4 according to the present embodiment, as hereinabove described, outer ring 41 and inner ring 42 serving as the race members are made of the steel containing at least 3.75 mass % of chromium, and ball 43 serving as the rolling element is made of ceramic, whereby reduction in hardness of the bearing components in a high-temperature environment is suppressed. Further, outer ring nitrogen-enriched layer 41B and inner ring nitrogen-enriched layer 42B in which the totals of the carbon concentrations and the nitrogen concentrations are set in the proper range are formed on the regions including outer ring raceway surface 41A and inner ring raceway surface 42A of outer ring 41 and inner ring 42 made of the steel having the proper component composition, and ball 43 is made of ceramic, whereby the durability of the bearing components in a contaminated environment is improved. In addition, outer and inner rings 41 and 42 of steel in combination with ceramic ball 43 achieve improved smearing resistance and improved dry-run performance. Consequently, three-point contact ball bearing 4 is a ball bearing attaining not only suppression of reduction in hardness of the bearing components in a high-temperature environment, improvement in durability in a contaminated environment, improvement in smearing resistance, but also improvement of the dry-run performance.

Figure 15:
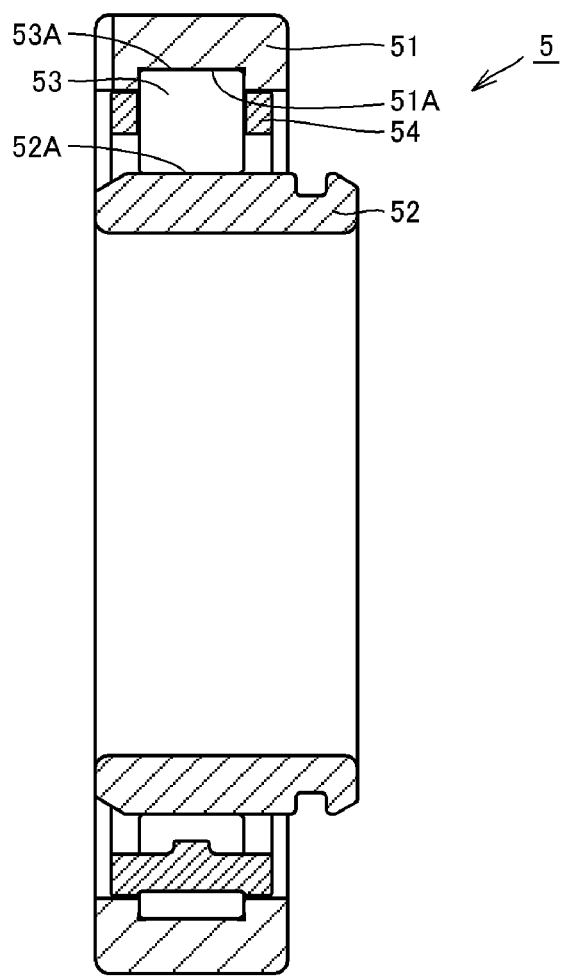
FIG. 15 is a schematic cross section of the structure of a cylindrical roller bearing.
Figure 16:
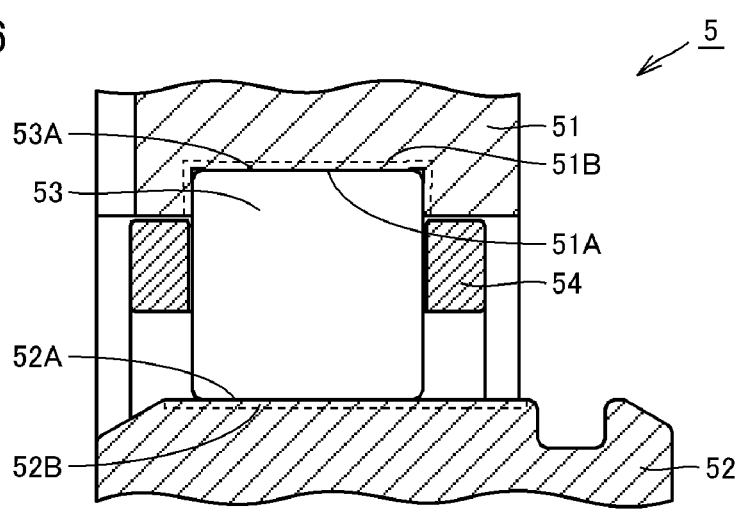
FIG. 16 is an enlarged schematic partial cross section of a principal part of FIG. 15.

With reference to FIG. 15 and FIG. 16, the present embodiment in an exemplary variation provides a cylindrical roller bearing, as will be described hereinafter.

Referring to FIG. 15, a cylindrical roller bearing 5 includes an annular outer ring 51, an annular inner ring 52 arranged inside outer ring 51 and a plurality of rollers 53 as rolling elements arranged between outer ring 51 and inner ring 52 and retained in an annular cage 54. Rollers 53 are cylindrical. An outer ring raceway surface 51A is formed on the inner circumferential surface of outer ring 51, while an inner ring raceway surface 52A is formed on the outer circumferential surface of inner ring 52. Outer ring 51 and inner ring 52 are so arranged that inner ring raceway surface 52A and outer ring raceway surface 51A are opposed to each other. The plurality of rollers 53 are in contact with inner ring raceway surface 52A and outer ring raceway surface 51A on roller rolling contact surfaces 53A which are the outer circumferential surfaces thereof, and arranged at a prescribed pitch circumferentially by cage 54, to be retained on an annular raceway in a rollable manner. Outer ring 51 and inner ring 52 of cylindrical roller bearing 5 are mutually relatively rotatable due to the aforementioned structure.

Referring to FIG. 16, outer ring 51, inner ring 52 and rollers 53 of cylindrical roller bearing 5 in the present exemplary variation correspond to outer ring 41, inner ring 42 and balls 43 of three-point contact ball bearing 4, as described above, respectively, have similar structures, and exhibit similar effects. In other words, a race member implemented as outer ring 51 and inner ring 52 is made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity.

Furthermore, referring to FIG. 16, an outer ring nitrogen-enriched layer 51B and an inner ring nitrogen-enriched layer 52B having nitrogen concentrations of at least 0.05 mass % are formed on regions including outer ring raceway surface 51A and inner ring raceway surface 52A which are the surfaces of outer ring 51 and inner ring 52 respectively. The totals of carbon concentrations and the nitrogen concentrations in outer ring nitrogen-enriched layer 51B and inner ring nitrogen-enriched layer 52B are at least 0.82 mass % and not more than 1.9 mass %.

Furthermore, a rolling element implemented as roller 53 is of ceramic, such as a sintered body mainly composed of silicon nitride.

In the present exemplary variation, cylindrical roller bearing 5, as well as three-point contact ball bearing 4, has outer ring 51 and inner ring 52, serving as race members, made of steel containing at least 3.75 mass % of chromium, and roller 53, serving as a rolling element, made of ceramic, whereby reduction in hardness of the bearing components in a high-temperature environment is suppressed. Further, outer ring nitrogen-enriched layer 51B and inner ring nitrogen-enriched layer 52B in which the totals of the carbon concentrations and the nitrogen concentrations are set in the proper range are formed on the regions including outer ring raceway surface 51A and inner ring raceway surface 52A of outer ring 51 and inner ring 52 made of the steel having the proper component composition, and roller 53 is made of ceramic, whereby the durability of the bearing components in a contaminated environment is improved. In addition, outer and inner rings 51 and 52 of steel in combination with ceramic roller 53 achieve improved smearing resistance and improved dry-run performance. Consequently, cylindrical roller bearing 5 is a rolling bearing attaining not only suppression of reduction in hardness of the bearing components in a high-temperature environment, improvement in durability in a contaminated environment, improvement in smearing resistance, but also improvement of the dry-run performance.

The method of producing a rolling bearing according to the second embodiment of the present invention will now be described.

Figure 17:
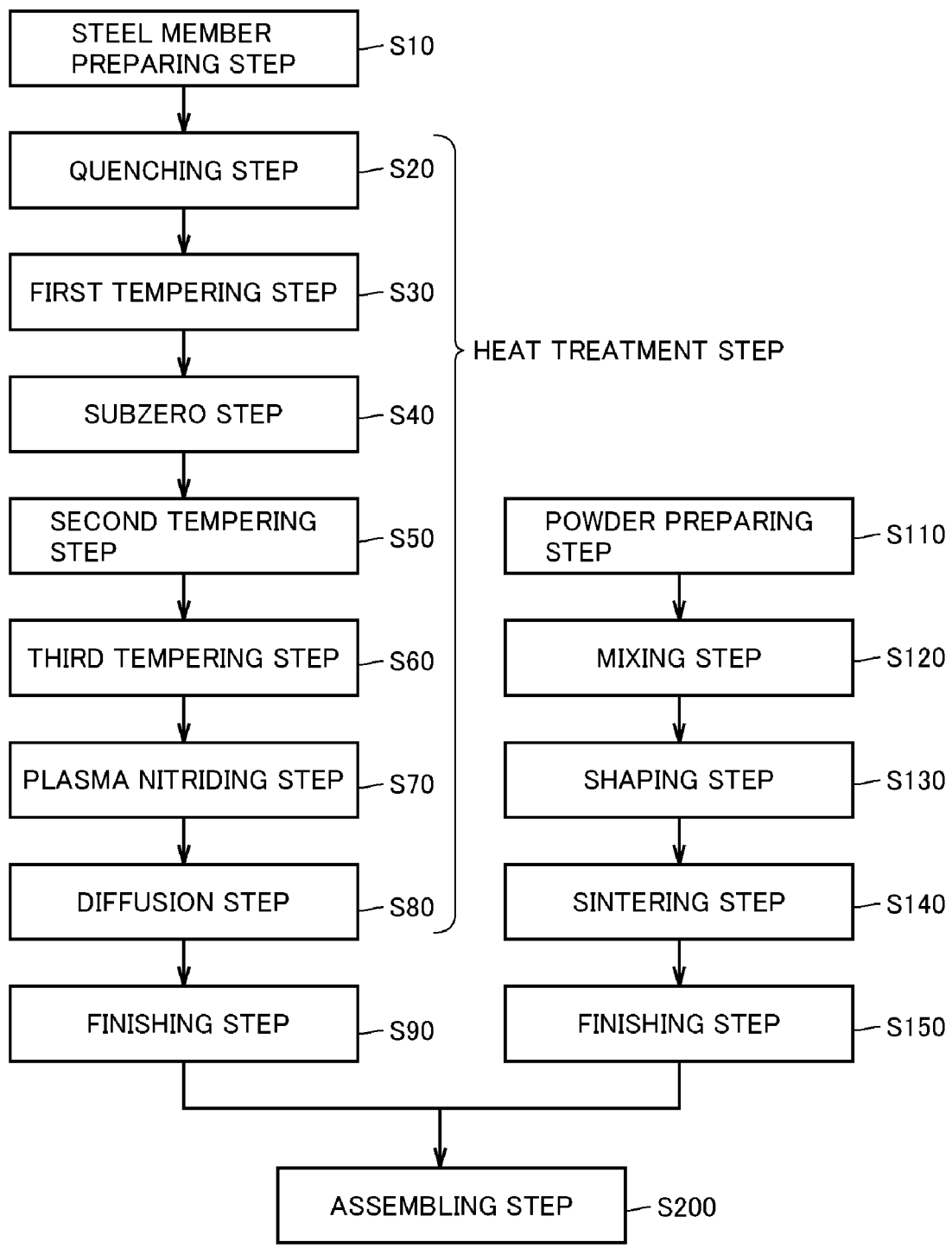
FIG. 17 is a flow chart outlining a method of producing a rolling bearing.

With reference to FIG. 17, the present embodiment provides the rolling bearing, produced in a method including a race member preparing step including steps (S10) to (S90), a rolling element preparing step including steps (S110) to (S150), and an assembling step carried out as a step (S200).

First, the race member preparing step will be described. In a steel member preparing step carried out as the step (S10), steel members made of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity, and formed into substantial shapes of race members are prepared. More specifically, working operations such as cutting, forging and turning are performed on steel bars or steel wires containing the aforementioned components, thereby preparing steel members formed into substantial shapes of outer rings 41, 51 and inner rings 42, 52 as the race members.

Then, a heat treatment step is carried out by performing a heat treatment including quenching and nitriding on the aforementioned steel members prepared in the step (S10). The heat treatment step includes a quenching step carried out as the step (S20), a first tempering step carried out as the step (S30), a subzero step carried out as the step (S40), a second tempering step carried out as the step (S50), a third tempering step carried out as the step (S60), a plasma nitriding step carried out as the step (S70) and a diffusion step carried out as the step (S80). This heat treatment step can be performed similarly as done in the first embodiment.

Then, a finishing step performing finishing etc. on the steel members subjected to the heat treatment step is carried out as the step (S90). More specifically, outer ring raceway surfaces 41A, 51A and inner ring raceway surfaces 42A, 52A of the steel members subjected to the heat treatment step are polished, for example. Thus, the race members in the present embodiment are completed, and the race member preparing step in the present embodiment is completed.

According to the race member preparing step in the above embodiment, race members (outer rings 41, 51 and inner rings 42, 52 etc.) made of steel containing at least 3.75 mass % of chromium, provided with hard nitrogen-enriched layers by nitriding surface layer portions and inhibited from formation of grain boundary precipitates can be produced. Consequently, the nitrogen-enriched layers having the nitrogen concentrations of at least 0.05 mass %, the totals of the carbon concentrations and the nitrogen concentrations of at least 0.82 mass % and not more than 1.9 mass %, the thicknesses of at least 0.1 mm and the hardness of at least 830 HV are formed on the regions including the surfaces (outer ring raceway surfaces 41A, 51A and inner ring raceway surfaces 42A, 52A etc.) of the race members (outer rings 41, 51 and inner rings 42, 52 etc.) in the present embodiment, while the number of detected grain boundary precipitates can be reduced to not more than one when each nitrogen-enriched layer is cut along a cross section perpendicular to the surface thereof and the cross section is observed with an optical microscope or an SEM randomly in five fields of view each of a square region including the surface and having each side of 150 µm.

Referring to FIG. 17, the rolling element preparing step is performed as follows: initially, step (S110) is performed to prepare ceramic powder, i.e., a powder preparing step is performed. More specifically, powder of ceramics, such as silicon nitride, for example, employed as a material constituting the rolling elements is prepared. Then, step (S120), or a mixing step, is performed. More specifically, a sintering additive is added to and mixed with the ceramic powder prepared in step (S110).

Then, referring to FIG. 17, the mixture of the ceramic powder and the sintering additive is formed into substantial shapes of rolling elements, i.e., step (S130) is performed. More specifically, the mixture of the ceramic powder and the sintering additive is molded by press molding, casting, extrusion molding or rolling granulation, thereby preparing formed bodies formed into substantial shapes of balls 43, rollers 53 serving as the rolling elements.

Then, as step (S140), these formed bodies are sintered. More specifically, the aforementioned formed bodies are sintered by pressure sintering such as HIP (hot isostatic pressing) or GPS (gas pressure sintering), to obtain sintered bodies having substantial shapes of outer rings 41, 51 and inner rings 42, 52.

Then, the surfaces of the sintered bodies obtained in step (S140) are worked and regions including the surfaces are removed, i.e., a finishing is performed to complete the rolling contact member, i.e., a finishing step is performed as step (S150). More specifically, the surfaces (or rolling contact surfaces) of the sintered bodies obtained in the sintering step are polished to complete balls 43, rollers 53 as the rolling elements. Thus the rolling element preparing step in the present embodiment is completed.

Then, referring to FIG. 17, the assembling step of assembling the completed bearing components into a rolling bearing is carried out as the step (S200). More specifically, outer ring 41, inner ring 42 and balls 43 prepared through the aforementioned steps and cage 44 separately prepared are assembled into three-point contact ball bearing 4, for example. Thus, the rolling bearing according to the present embodiment is completed.

Third Embodiment

The present invention in a third embodiment will now be described. A mechanical component according to the third embodiment is basically similar in structure to the case of the first embodiment, and can be similarly produced. However, the third embodiment is different from the first embodiment in the component composition of steel serving as a material and a heat treatment method, as described below.

Referring to FIG. 1 and FIG. 2, outer ring 11, inner ring 12, and ball 13 serving as mechanical components in the third embodiment are constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity. Referring to FIG. 2, outer ring nitrogen-enriched layer 11B, inner ring nitrogen-enriched layer 12B and ball nitrogen-enriched layer 13B having nitrogen concentrations of at least 0.05 mass % are formed on regions including outer ring raceway surface 11A, inner ring raceway surface 12A and ball rolling contact surface 13A which are the surfaces of outer ring 11, inner ring 12, and ball 13. The totals of carbon concentrations and the nitrogen concentrations in outer ring nitrogen-enriched layer 11B, inner ring nitrogen-enriched layer 12B and ball nitrogen-enriched layer 13B are at least 0.55 mass % and not more than 1.9 mass %. The aforementioned impurity includes unavoidable impurity such as that derived from the raw materials for the steel, that mixed in production steps and the like.

Outer ring 11, inner ring 12 and ball 13 serving as the mechanical components according to the present embodiment are made of the steel having the aforementioned proper component composition, and outer ring nitrogen-enriched layer 11B, inner ring nitrogen-enriched layer 12B and ball nitrogen-enriched layer 13B having the nitrogen concentrations of at least 0.05 mass % are formed on the regions including outer ring raceway surface 11A, inner ring raceway surface 12A and ball rolling contact surface 13A formed on the surfaces thereof. The totals of the carbon concentrations and the nitrogen concentrations in outer ring nitrogen-enriched layer 11B, inner ring nitrogen-enriched layer 12B and ball nitrogen-enriched layer 13B are so set in the proper range of at least 0.55 mass % and not more than 1.9 mass % that sufficient hardness is supplied to surface layer portions thereof and formation of grain boundary precipitates is suppressed. Consequently, outer ring 11, inner ring 12 and ball 13 serving as the mechanical components in the present embodiment are made of steel containing at least 4 mass % of chromium and provided with nitrogen-enriched layers on the surface layer portions thereof, while sufficiently ensuring fatigue resistance and toughness. Furthermore, outer ring 11, inner ring 12 and ball 13 allow a rolling bearing implemented as deep groove ball bearing 1 to have a long life.

Preferably, the thicknesses of outer ring nitrogen-enriched layer 11B, inner ring nitrogen-enriched layer 12B and ball nitrogen-enriched layer 13B formed on outer ring 11, inner ring 12 and ball 13 are at least 0.11 mm. Thus, sufficient strength is supplied to outer ring 11, inner ring 12 and ball 13.

Preferably, outer ring nitrogen-enriched layer 11B, inner ring nitrogen-enriched layer 12B and ball nitrogen-enriched layer 13B have hardness of at least 800 HV. Thus, the strength of outer ring 11, inner ring 12 and ball 13 can be more reliably ensured.

Preferably, the number of nitrides of iron each having an aspect ratio of at least 2 and a length of at least 7.5 µm is not more than one in five fields of view of square regions of 150

µm on each side when outer ring nitrogen-enriched layer 11B, inner ring nitrogen-enriched layer 12B and ball nitrogen-enriched layer 13B are observed with a microscope. Thus, the fatigue resistance of outer ring 11, inner ring 12 and ball 13 can be improved.

Furthermore, with reference to FIG. 3 and FIG. 4, the present embodiment in the first exemplary variation, i.e., bearing washer 21 and needle roller 23 of thrust needle roller bearing 2 correspond to outer and inner rings 11 and 12 and ball 13 of deep groove ball bearing 1, respectively, in the above-described present embodiment, and the former is similar to the latter in configuration and effect. More specifically, bearing washer 21 and needle roller 23 serving as the mechanical components are made of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity. Referring to FIG. 4, bearing washer nitrogen-enriched layer 21B and roller nitrogen-enriched layer 23B having nitrogen concentrations of at least 0.05 mass % are formed on regions including bearing washer raceway surface 21A and roller rolling contact surface 23A which are the surfaces of bearing washer 21 and needle roller 23. The totals of carbon concentrations and the nitrogen concentrations in bearing washer nitrogen-enriched layer 21B and roller nitrogen-enriched layer 23B are at least 0.55 mass % and not more than 1.9 mass %.

Bearing washer 21 and needle roller 23 serving as the mechanical components according to the present exemplary variation are made of steel having the aforementioned proper component composition, and provided with bearing washer nitrogen-enriched layer 21B and roller nitrogen-enriched layer 23B having nitrogen concentrations of at least 0.05 mass % on regions including bearing washer raceway surface 21A and roller rolling contact surface 23A formed on the surfaces thereof. The totals of carbon concentrations and the nitrogen concentrations in bearing washer nitrogen-enriched layer 21B and a roller nitrogen-enriched layer 23B are set in the proper range of at least 0.55 mass % and not more than 1.9 mass %, so that sufficient hardness is supplied to surface layer portions and formation of grain boundary precipitates is suppressed. Consequently, bearing washer 21 and needle roller 23 serving as the mechanical components in the present exemplary variation are mechanical components made of steel containing at least 4 mass % of chromium and provided with the nitrogen-enriched layers on the surface layer portions thereof, while sufficiently ensuring fatigue resistance and toughness. Furthermore, bearing washer 21 and needle roller 23 allow the rolling bearing, or thrust needle roller bearing 2, to have a long life.

Furthermore, with reference to FIG. 5 to FIG. 9, the present embodiment in the second exemplary variation, i.e., the constant velocity joint 3 inner and outer races 31 and 32 and ball 33 correspond to the deep groove ball bearing 1 outer and inner rings 11 and 12 and ball 13, respectively, in the above-described present embodiment, and the former is similar to the latter in configuration and effect. More specifically, inner and outer races 31 and 32 and ball 33 serving as the mechanical components are made of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity. Referring to FIG. 8 and FIG. 9, inner race nitrogen-enriched layer 31B, outer race nitrogen-enriched layer 32B, and ball nitrogen-enriched layer 33B having nitrogen concentrations of at least 0.05 mass % are formed on regions including a surface of inner race ball groove 31A, a surface of outer race ball groove 32A, and ball rolling contact surface 33A which are the surfaces of inner and outer races 31 and 32 and ball 33. The totals of carbon concentrations and the nitrogen concentrations in inner race nitrogen-enriched layer 31B, outer race nitrogen-enriched layer 32B, and ball nitrogen-enriched layer 33B are at least 0.55 mass % and not more than 1.9 mass %.

Inner and outer races 31 and 32 and ball 33 serving as the mechanical components according to the present exemplary variation are made of steel having the aforementioned proper component composition, and provided with inner race nitrogen-enriched layer 31B, outer race nitrogen-enriched layer 32B, and ball nitrogen-enriched layer 33B having nitrogen concentrations of at least 0.05 mass % on regions including the surface of inner race ball groove 31A, the surface of outer race ball groove 32A, and ball rolling contact surface 33A formed on the surfaces thereof. The totals of carbon concentrations and the nitrogen concentrations in inner race nitrogen-enriched layer 31B, outer race nitrogen-enriched layer 32B, and ball nitrogen-enriched layer 33B are set in the proper range of at least 0.55 mass % and not more than 1.9 mass %, so that sufficient hardness is supplied to surface layer portions and formation of grain boundary precipitates is suppressed. Consequently, inner and outer races 31 and 32 and ball 33 serving as the mechanical components in the present exemplary variation are mechanical components made of steel containing at least 4 mass % of chromium and provided with the nitrogen-enriched layers on the surface layer portions thereof, while sufficiently ensuring fatigue resistance and toughness. Furthermore, inner race 31, outer race 32 and ball 33 allow the universal joint, or constant velocity joint 3, to have a long life.

Hereinafter a method of producing a mechanical component, and a rolling bearing, a constant velocity joint and the like mechanical element including the mechanical component according to the third embodiment will now be described.

Figure 18:
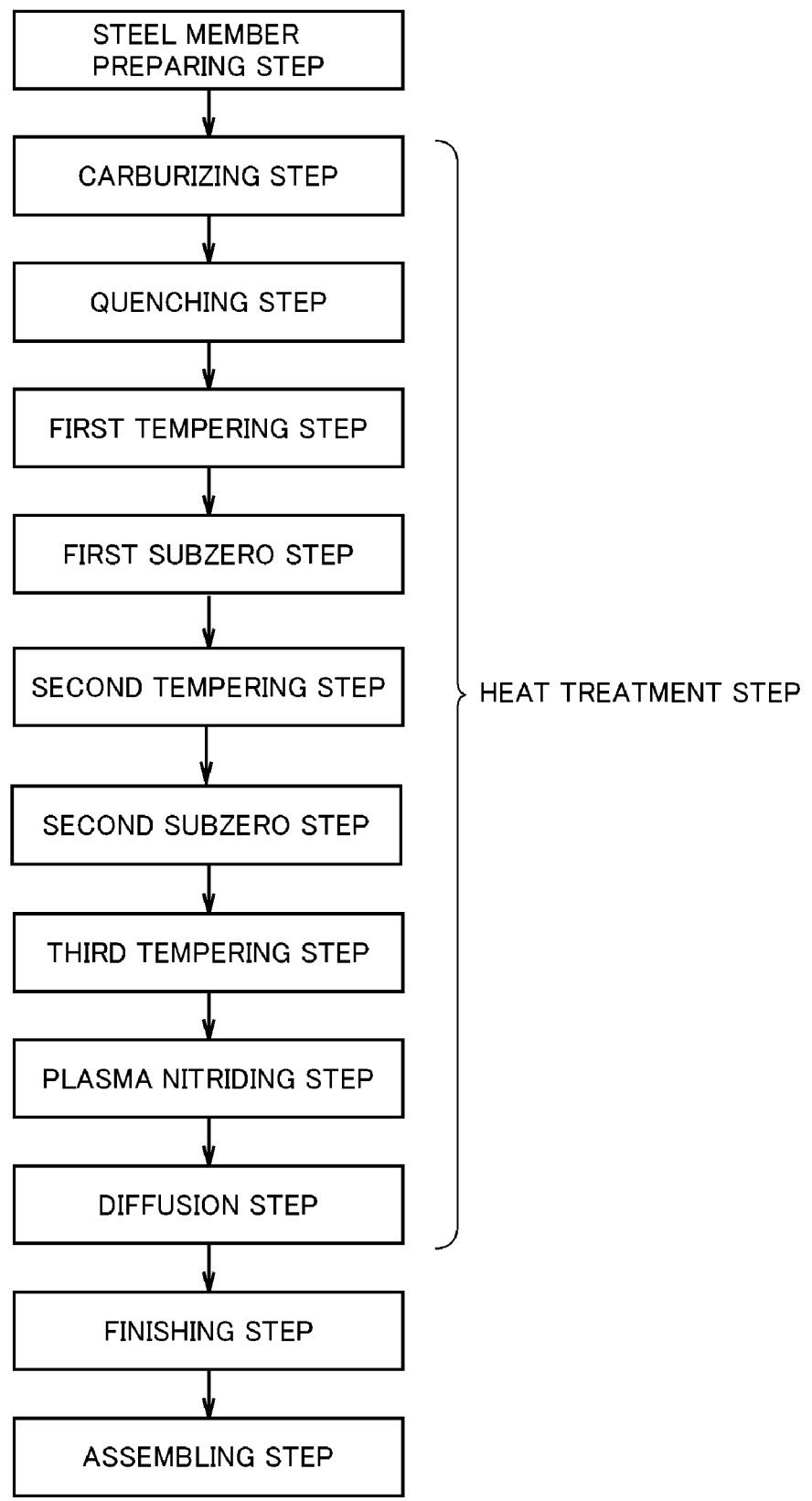
FIG. 18 generally illustrates a method of producing the mechanical component and a method of producing a mechanical element including the mechanical component in a third embodiment of the present invention.

With reference to FIG. 18, initially, steel members made of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity, and formed into substantial shapes of mechanical components are prepared, i.e., a steel member preparing step is carried out. More specifically, working operations such as cutting, forging and turning are performed on steel bars or steel wires containing the aforementioned components, thereby preparing steel members formed into substantial shapes of the mechanical components such as outer ring 11, bearing washer 21, inner race 31 and the like as the mechanical components.

Then, a heat treatment step is carried out by performing a heat treatment including quenching and nitriding the aforementioned steel members prepared in the steel member preparing step. The details of this heat treatment step will be described later.

Then, a finishing step performing finishing etc. on the steel members subjected to the heat treatment step is carried out. More specifically, inner ring raceway surface 12A, bearing washer raceway surface 21A, outer race ball groove 32A and the like of the steel members subjected to the heat treatment step are polished, for example. This completes a mechanical component in the present embodiment and the method of producing the mechanical component in the present embodiment is completed.

Furthermore, the assembling step of assembling the completed mechanical components into a mechanical element is carried out. More specifically, the mechanical components of the present invention produced through the aforementioned steps, e.g., outer ring 11, inner ring 12, ball 13 and cage 14 are assembled into deep groove ball bearing 1. Thus, a mechanical element including a mechanical component of the present invention is produced.

Figure 19:
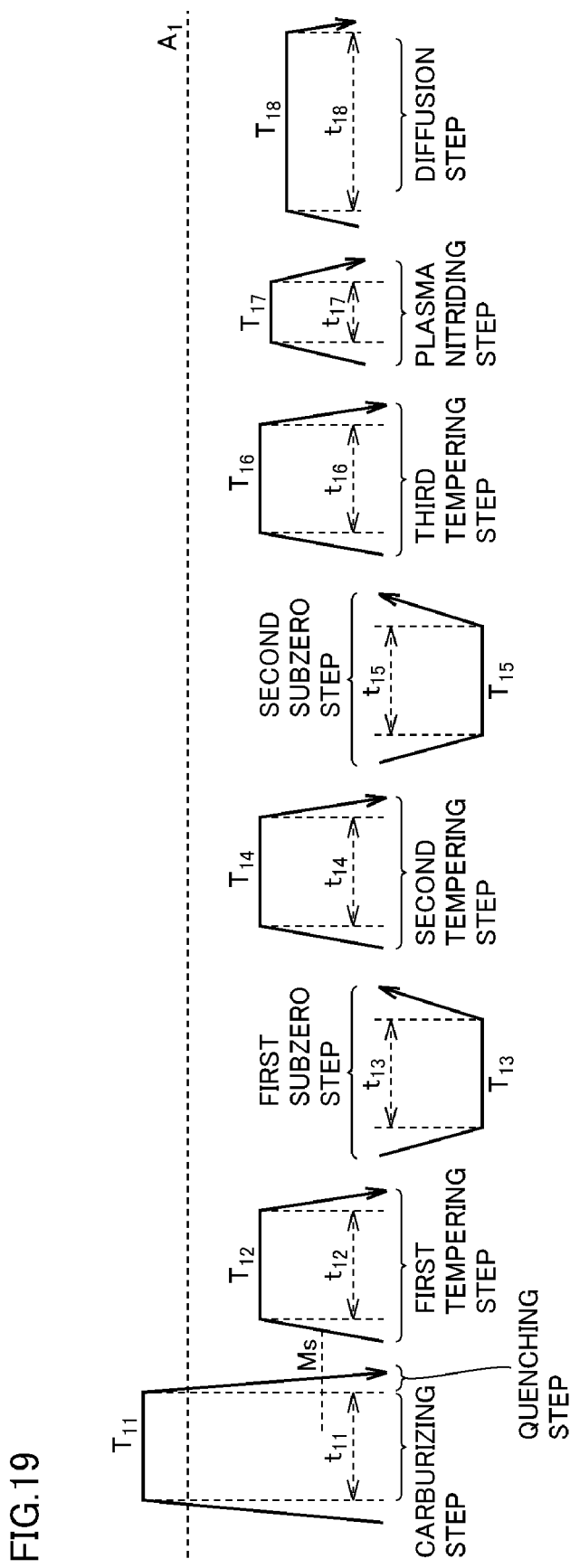
FIG. 19 is a diagram for illustrating the details of a heat treatment step included in the method of producing the mechanical component.

The details of the heat treatment step above will now be described with reference to FIG. 18 and FIG. 19. Referring to FIG. 19, time shown in the horizontal direction elapses rightward. Referring to FIG. 19, further, temperature shown in the vertical direction is increased upward.

Referring to FIG. 18, the carburizing step is first carried out for carburizing the steel members as the objects to be treated in the heat treatment step in the method of producing the mechanical component according to the present embodiment. More specifically, referring to FIG. 19, the steel members are heated to a temperature $T_{11}$ equal to or higher than the transformation temperature $A_1$ in an atmosphere of carburizing gas containing carbon monoxide and hydrogen, and maintained at this temperature for a time $t_{11}$, for example, so that carbon penetrates into surface layer portions of the steel members. Thus, carburized layers having higher carbon concentrations as compared with inner regions other than regions including the surfaces of the steel members are formed on the regions including the surfaces of the steel members.

Referring to FIG. 18, the quenching step is carried out on the steel members subjected to the carburization treatment. More specifically, with reference to FIG. 19, the steel members are cooled from the temperature $T_{11}$ equal to or higher than the transformation temperature $A_1$ to a temperature equal to or lower than the point $M_s$, to be quench-hardened.

Then, with reference to FIG. 18, the first tempering step is carried out on the quenched steel members. More specifically, referring to FIG. 19, the steel members are heated to a temperature $T_{12}$ less than the transformation temperature $A_1$ in a decompressed atmosphere (vacuum), maintained at this temperature for a time $t_{12}$, and thereafter cooled to be tempered, for example. Thus, residual stress resulting from the quenching of the steel members is relaxed, and strain resulting from the heat treatment is suppressed.

Then, with reference to FIG. 18, the first subzero step is carried out on the steel members subjected to the first tempering step. More specifically, referring to FIG. 19, a subzero treatment is performed by spraying liquid nitrogen, for example, onto the steel members for cooling the steel members to a temperature $T_{13}$ less than 0° C., and maintaining the same at this temperature for a time $t_{13}$. Thus, retained austenite formed by the quenching of the steel members transforms into martensite, for stabilizing the structure of the steel.

Then, with reference to FIG. 18, the second tempering step is carried out on the steel members subjected to the first subzero step. More specifically, referring to FIG. 19, for example, the steel members are heated to a temperature $T_{14}$ less than the transformation temperature $A_1$ in a decompressed atmosphere (vacuum), maintained at this temperature for a time $t_{14}$, and thereafter cooled, to be tempered. Thus, residual stress resulting from the subzero treatment of the steel members is relaxed, and strain is suppressed.

Then, with reference to FIG. 18, the second subzero step is carried out on the steel members subjected to the second tempering step. More specifically, referring to FIG. 19, the subzero treatment is performed again by spraying liquid nitrogen, for example, onto the steel members for cooling the steel members to a temperature $T_{15}$ less than 0° C., and maintaining the same at this temperature for a time $t_{15}$. Thus, retained austenite formed by the quenching of the steel members further transforms into martensite, for further stabilizing the structure of the steel.

Then, with reference to FIG. 18, the third tempering step is carried out on the steel members subjected to the second subzero step. More specifically, referring to FIG. 19, the steel members are heated to a temperature $T_{16}$ less than the transformation temperature $A_1$ in a vacuum, maintained at this temperature for a time $t_{16}$, and thereafter cooled, to be tempered, for example, similarly to the aforementioned second tempering step. The temperature $T_{16}$ and the time $t_{16}$ can be set similarly to the temperature $T_{14}$ and the time $t_{14}$ in the second tempering step respectively. Thus, residual stress which can result from the subzero treatment of the steel members in the second subzero step is relaxed, and strain is suppressed.

Then, with reference to FIG. 18, the plasma nitriding step is carried out on the steel members subjected to the third tempering step. More specifically, referring to FIG. 19, the steel members are inserted into a plasma nitriding furnace into which nitrogen ($N_2$) and at least one element selected from the group consisting of hydrogen ($H_2$), methane ($CH_4$) and argon (Ar) are introduced so that the pressure is at least 50 Pa and not more than 5000 Pa, and the steel members are heated to a temperature $T_{17}$ under conditions of a discharge voltage of at least 50 V and not more than 1000 V and a discharge current of at least 0.001 A and not more than 100 A, maintained at this temperature for a time $t_{17}$, and thereafter cooled, to be plasma-nitrided, for example. Thus, nitrogen penetrates into the surface layer portions of the steel members and thus forms a nitrogen enriched layer, thereby improving the strength of the surface layer portions. The temperature $T_{17}$ can be set to at least 300° C. and not more than 550° C., for example, and the time $t_{17}$ can be set to at least one hour and not more than 80 hours. The heat treatment conditions such as the temperature $T_{17}$ and the time $t_{17}$ can be so decided that grain boundary precipitate layers formed in the plasma nitriding treatment have such thicknesses or smaller that the grain boundary precipitate layers (layers having grain boundary precipitates) can be removed in the finishing step in consideration of removal amounts in the finishing performed in the finishing step.

When the steel constituting the steel members is AMS 6278 (AISI M50 NiL), the pressure, the discharge voltage, the discharge current, the temperature $T_{17}$ and the time $t_{17}$ in the plasma nitriding step are preferably set to at least 50 Pa and not more than 1000 Pa, at least 50 V and not more than 600 V, at least 0.001 A and not more than 300 A, at least 350° C. and not more than 450° C. and at least one hour and not more than 50 hours respectively.

Then, with reference to FIG. 18, the diffusion step is carried out on the steel members subjected to the plasma nitriding step. More specifically, referring to FIG. 19, the steel members are heated to a temperature $T_{18}$ in a vacuum and maintained at this temperature for a time $t_{18}$, to be diffusion-treated, for example. The temperature $T_{18}$ can be set to at least 300° C. and not more than 480° C., preferably at least 300° C. and not more than 430° C., and the time $t_{18}$ can be set to at least 50 hours and not more than 300 hours. Thus, the nitrogen having penetrated into the steel can be made to reach desired regions while suppressing cancellation of increase in the hardness of the surface layer portions resulting from formation of nitrided layers. Even if a plasma nitriding process is performed to cause nitrogen to penetrate into steel to a depth falling within a range allowing a finishing step to remove a grain boundary precipitate layer, the diffusion step allows the nitrogen having penetrated into the steel to reach a desired region. The above steps complete the heat treatment step in the present embodiment.

According to the method of heat treatment for steel in the present embodiment, as hereinabove described, a nitrogen enriched layer of high hardness can be formed by nitriding a surface layer portion of steel containing at least 4 mass % of chromium, and formation of grain boundary precipitates can be suppressed.

Furthermore, according to the method of producing a mechanical component in the above embodiment, mechanical components (outer ring 11, bearing washer 21, inner race 31 etc.) made of steel containing at least 4 mass % of chromium, provided with hard nitrogen-enriched layers by nitriding surface layer portions and inhibited from formation of grain boundary precipitates can be produced. Consequently, the nitrogen-enriched layers having the nitrogen concentrations of at least 0.05 mass %, the totals of the carbon concentrations and the nitrogen concentrations of at least 0.55 mass % and not more than 1.9 mass %, the thicknesses of at least 0.11 mm and the hardness of at least 800 HV are formed on the regions including the surfaces (outer ring raceway surface 11A, bearing washer raceway surface 21A, a surface of inner race ball groove 31A etc.) of the mechanical components (outer ring 11, bearing washer 21, inner race 31 etc.) in the present embodiment as hereinabove described, while the number of detected grain boundary precipitates can be reduced to not more than one when each nitrogen-enriched layer is cut along a cross section perpendicular to the surface thereof and the cross section is observed with an optical microscope or an SEM randomly in five fields of view each of a square region including the surface and having each side of 150 μm. The carbon concentration and the nitrogen concentration in each nitrogen-enriched layer can be controlled by adjusting the treatment time of the plasma nitriding performed in the plasma nitriding step and the treating time of the diffusion treatment performed in the diffusion step, for example.

Fourth Embodiment

The present invention in a fourth embodiment will now be described. A rolling bearing according to the fourth embodiment is basically similar in structure to the case of the second embodiment, and can be similarly produced. However, the fourth embodiment is different from the second embodiment in the component composition of steel serving as a material and a heat treatment method, as described below.

Figure 14:
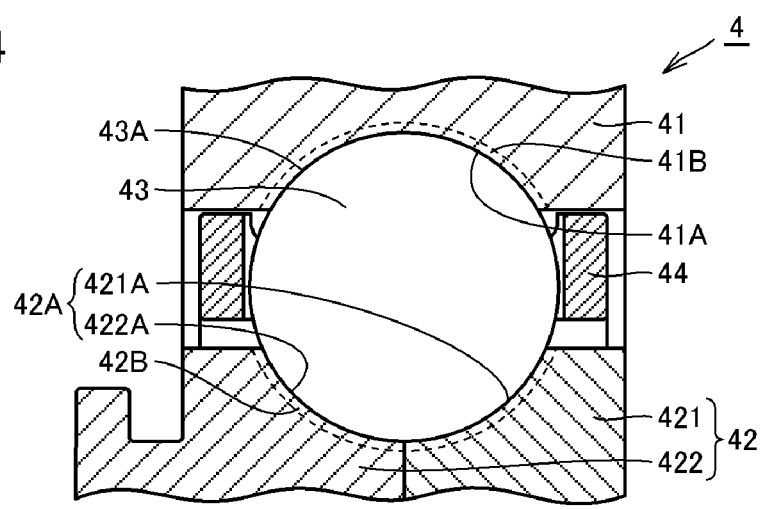
FIG. 14 is an enlarged schematic partial cross section of a principal part of FIG. 13.

More specifically, with reference to FIG. 12 to FIG. 14, in turbofan engine 70, rolling bearing 89 supporting low-pressure main shaft 74 or high-pressure main shaft 77 to be rotatable with respect to a member adjacent to low-pressure main shaft 74 or high-pressure main shaft 77 is used in a high-temperature environment due to influence by heat generated in turbofan engine 70. Further, hard foreign matter such as metallic powder or carbon powder may penetrate into rolling bearing 89. Therefore, suppression of reduction in hardness of bearing components in the high-temperature environment and improvement in durability in a contaminated environment are required to rolling bearing 89. Furthermore, smearing must be reduced/prevented to support rapid rotation of low-pressure main shaft 74 or high-pressure main shaft 77. Further, dry-run performance is also required to rolling bearing 89 so that, even if lubrication of rolling bearing 89 is temporarily stopped by some cause when turbofan engine 70 is installed in an aircraft, rolling bearing 89 continuously rotatably supports low-pressure main shaft 74 or high-pressure main shaft 77 without seizure until the lubrication is recovered.

When rolling bearing 89 is formed by a rolling bearing according to the fourth embodiment described below, the aforementioned requirements can be satisfied.

Referring to FIG. 13 and FIG. 14, outer ring 41 and inner ring 42 serving as race members are constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity. Referring to FIG. 2, outer ring nitrogen-enriched layer 41B and inner ring nitrogen-enriched layer 42B having nitrogen concentrations of at least 0.05 mass % are formed on regions including outer ring raceway surface 41A and inner ring raceway surface 42A which are the surfaces of outer ring 41 and inner ring 42. The totals of carbon concentrations and the nitrogen concentrations in outer ring nitrogen-enriched layer 41B and inner ring nitrogen-enriched layer 42B are at least 0.55 mass % and not more than 1.9 mass %. The aforementioned impurity includes unavoidable impurity such as that derived from the raw materials for the steel, that mixed in production steps and the like.

Balls 43 serving as the rolling elements are made of ceramics. More specifically, in the present embodiment, balls 43 are formed of sintered bodies mainly composed of silicon nitride with a remainder consisting of impurity. The sintered bodies may contain a sintering additive such as aluminum oxide ($Al_2O_3$) or yttrium oxide ($Y_2O_3$).

Outer ring 41 and inner ring 42 serving as the race members of three point contact ball bearing 4 according to the present embodiment are made of the steel having the aforementioned proper component composition, and outer ring nitrogen-enriched layer 41B and inner ring nitrogen-enriched layer 42B having the nitrogen concentrations of at least 0.05 mass % are formed on the regions including outer ring raceway surface 41A and inner ring raceway surface 42A formed on the surfaces thereof. The totals of the carbon concentrations and the nitrogen concentrations in outer ring nitrogen-enriched layer 41B and inner ring nitrogen-enriched layer 42B are so set in the proper range of at least 0.55 mass % and not more than 1.9 mass % that sufficient hardness is supplied to surface layer portions thereof and formation of grain boundary precipitates is suppressed. Consequently, outer ring 41 and inner ring 42 serving as the race members in the present embodiment are bearing components made of steel containing at least 4 mass % of chromium and provided with nitrogen-enriched layers on the surface layer portions thereof, while sufficiently ensuring fatigue resistance and toughness.

In three-point contact ball bearing 4 according to the present embodiment, balls 43 serving as the rolling elements are made of ceramics. Thus, smearing is reduced/prevented, and furthermore, as outer and inner rings 41 and 42 and balls 43 coming into contact with each other are made of different materials, the seizure resistance is improved. Consequently, smearing resistance, and simultaneously, endurance in an insufficiently lubricated environment, such as dry-run performance, are improved. The ceramics having higher hardness than the steel is employed as the material for balls 43, whereby durability of balls 43 is improved in a contaminated environment. Further, balls 43 are so made of the ceramics that reduction in hardness of balls 43 in a high-temperature environment is suppressed. In addition, balls 43 are so made of the ceramics that the weights of balls 43 as well as centrifugal force acting on balls 43 are reduced as compared with a case where balls 43 are made of steel, whereby three-point contact ball bearing 4 is suitable as a rolling bearing supporting a member rotating at a high speed, in particular.

In three-point contact ball bearing 4 according to the present embodiment, as hereinabove described, outer ring 41 and inner ring 42 serving as the race members are made of the steel containing at least 4 mass % of chromium, and ball 43 serving as the rolling element is made of ceramic, whereby reduction in hardness of the bearing components in a high-temperature environment is suppressed. Further, outer ring nitrogen-enriched layer 41B and inner ring nitrogen-enriched layer 42B in which the totals of the carbon concentrations and the nitrogen concentrations are set in the proper range are formed on the regions including outer ring raceway surface 41A and inner ring raceway surface 42A of outer ring 41 and inner ring 42 made of the steel having the proper component composition, and ball 43 is made of ceramic, whereby the durability of the bearing components in a contaminated environment is improved. In addition, outer and inner rings 41 and 42 of steel in combination with ceramic ball 43 achieve improved smearing resistance and improved dry-run performance. Consequently, three-point contact ball bearing 4 is a rolling bearing attaining not only suppression of reduction in hardness of the bearing components in a high-temperature environment, improvement in durability in a contaminated environment, improvement in smearing resistance, but also improvement of the dry-run performance.

Referring to FIG. 15 and FIG. 16, outer ring 51, inner ring 52 and rollers 53 of cylindrical roller bearing 5 in an exemplary variation of the present embodiment correspond to outer ring 41, inner ring 42 and balls 43 of three-point contact ball bearing 4 described above, respectively, have similar structures, and exhibit similar effects. More specifically, outer ring 51 and inner ring 52 serving as race members are constituted of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity.

Referring to FIG. 16, outer ring nitrogen-enriched layer 51B and inner ring nitrogen-enriched layer 52B having nitrogen concentrations of at least 0.05 mass % are formed on regions including outer ring raceway surface MA and inner ring raceway surface 52A which are the surfaces of outer ring 51 and inner ring 52. The totals of carbon concentrations and the nitrogen concentrations in outer ring nitrogen-enriched layer 51B and inner ring nitrogen-enriched layer 52B are at least 0.55 mass % and not more than 1.9 mass %.

Rollers 53 serving as the rolling elements are made of ceramics, such as sintered body composed mainly of silicon nitride.

In the present exemplary variation, cylindrical roller bearing 5, as well as three-point contact ball bearing 4 described above, has outer ring 51 and inner ring 52 serving as the race members, made of the steel containing at least 4 mass % of chromium, and roller 53, serving as the rolling element, made of ceramic, whereby reduction in hardness of the bearing components in a high-temperature environment is suppressed. Further, outer ring nitrogen-enriched layer 51B and inner ring nitrogen-enriched layer 52B in which the totals of the carbon concentrations and the nitrogen concentrations are set in the proper range are formed on the regions including outer ring raceway surface 51A and inner ring raceway surface 52A of outer ring 51 and inner ring 52 made of the steel having the proper component composition, and roller 53 is made of ceramic, whereby the durability of the bearing components in a contaminated environment is improved. In addition, outer and inner rings 51 and 52 of steel in combination with ceramic roller 53 achieve improved smearing resistance and improved dry-run performance. Consequently, cylindrical roller bearing 5 is a rolling bearing attaining not only suppression of reduction in hardness of the bearing components in a high-temperature environment, improvement in durability in a contaminated environment, improvement in smearing resistance, but also improvement of the dry-run performance.

A method of producing a rolling bearing according to the fourth embodiment will now be described.

Figure 20:
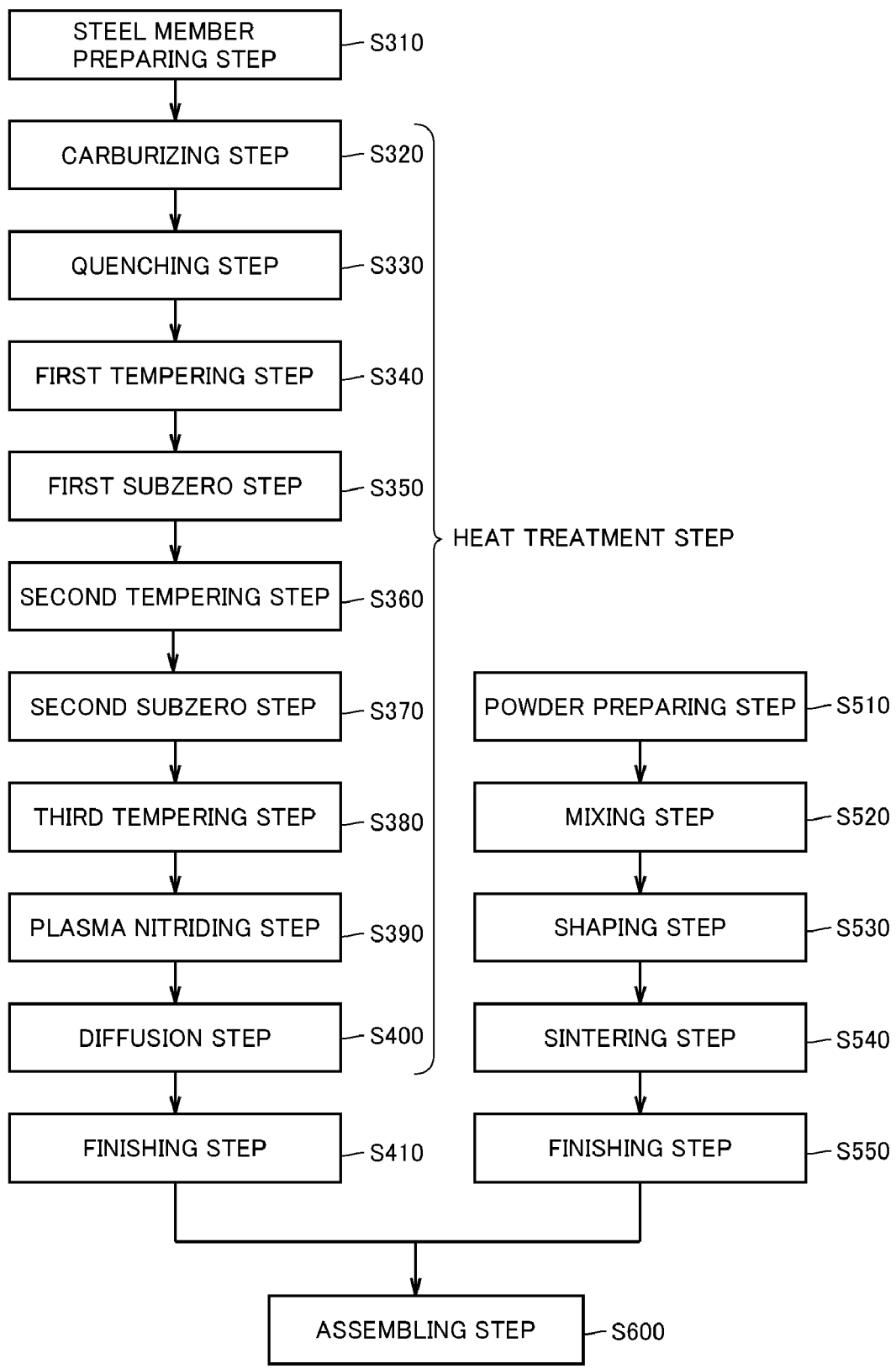
FIG. 20 is a flow chart outlining a method of producing a rolling bearing.

Referring to FIG. 20, the method of producing a rolling bearing according to the present embodiment includes a race member preparing step including steps (S310) to (S410), a rolling element preparing step including steps (S510) to (S550) and an assembling step carried out as a step (S600).

The race member preparing step is first described. In a steel member preparing step carried out as the step (S310), steel members made of steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity, and formed into substantial shapes of race members are prepared. More specifically, working operations such as cutting, forging and turning are performed on steel bars or steel wires containing the aforementioned components, thereby preparing steel members formed into substantial shapes of outer rings 41, 51 and inner rings 42, 52 as the race members.

Then, a heat treatment step performing heat treatment including quenching and nitriding is carried out on the aforementioned steel members prepared in the step (S310). This heat treatment step includes a carburizing step carried out as the step (S320), a quenching step carried out as the step (S330), a first tempering step carried out as the step (S340), a first subzero step carried out as the step (S350), a second tempering step carried out as the step (S360), a second subzero step carried out as the step (S370), a third tempering step carried out as the step (S380), a plasma nitriding step carried out as the step (S390) and a diffusion step carried out as the step (S400). This heat treatment step can be performed similarly as done in the third embodiment.

Then, a finishing step is carried out as the step (S410) on the steel members subjected to the heat treatment step. More specifically, outer ring raceway surfaces 41A, 51A, inner ring raceway surfaces 42A, 52A etc. of the steel members subjected to the heat treatment step are polished, for example. This completes the race member in the present embodiment and the race member preparing step in the present embodiment is completed.

According to the race member preparing step in the above embodiment, race members (outer rings 41, 51 and inner rings 42, 52 etc.) made of steel containing at least 4 mass % of chromium, provided with hard nitrogen-enriched layers by nitriding surface layer portions and inhibited from formation of grain boundary precipitates can be produced. Consequently, the nitrogen-enriched layers having the nitrogen concentrations of at least 0.05 mass %, the totals of the carbon concentrations and the nitrogen concentrations of at least 0.55 mass % and not more than 1.9 mass %, the thicknesses of at least 0.1 mm and the hardness of at least 800 HV are formed on the regions including the surfaces (outer ring raceway surfaces 41A, 51A, inner ring raceway surfaces 42A, 52A etc.) of the race members (outer rings 41, 51 and inner rings 42, 52 etc.) in the present embodiment as hereinabove described, while the number of detected grain boundary precipitates can be reduced to not more than one when each nitrogen-enriched layer is cut along a cross section perpendicular to the surface thereof and the cross section is observed with an optical microscope or an SEM randomly in five fields of view each of a square region including the surface and having each side of 150 μm.

On the other hand, with reference to FIG. 20, in the rolling element preparing step, a powder preparing step, a mixing step, a shaping step, a sintering step and a finishing step are performed as steps (S510)-(S550) sequentially. Steps (S510)-(S550) can be performed similarly as done in steps (S110)-(S150) in the second embodiment. Then, referring to FIG. 20, the assembling step of assembling the completed bearing components into a rolling bearing is carried out as the step (S600). More specifically, outer ring 41, inner ring 42 and balls 43 prepared through the aforementioned steps and cage 44 separately prepared are assembled into three-point contact ball bearing 4, for example. Thus, the rolling bearing according to the present embodiment is completed.

Note that while in the above embodiment the present mechanical component has been described by way of example as a mechanical component configuring a deep groove ball bearing, a thrust needle roller bearing, and a constant velocity joint, the present mechanical component is not limited thereto, and may be a mechanical component required to have a surface layer portion having fatigue resistance, wear resistance and the like, such as a mechanical component configuring a hub, a gear, a shaft and the like. Furthermore, while in the above embodiment the present rolling bearing has been described by way of example as a three-point contact ball bearing and a cylindrical roller bearing, the present rolling bearing is not limited thereto and can be applied to a deep groove ball bearing, an angular contact ball bearing, a thrust needle roller bearing, or other various types of rolling bearings.

Example 1

Example 1 of the present invention will now be described. A sample having a structure similar to that of the present mechanical component was actually prepared in the method of producing the mechanical component that adopts the heat treatment method for steel according to the first embodiment, and subjected to an experiment of confirming that formation of grain boundary precipitates on a surface layer portion was suppressed. The procedure of the experiment is as follows:

First, a specimen having an outer diameter φ of 40 mm, an inner diameter φ of 30 mm and a thickness t of 16 mm was produced by preparing and working a steel material made of AMS 6490 (AISI M50), a steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity.

Then, a heat treatment step employing the heat treatment method for steel, as described with reference to FIG. 11 in the above embodiment was carried out on this specimen. The temperatures $T_1$, $T_2$, $T_3$, $T_4$ and $T_5$ and the times $t_1$, $t_2$, $t_3$, $t_4$ and $t_5$ were so set that the hardness of the specimen after the third tempering step was at least 58 HRC and not more than 65 HRC, while the temperatures $T_6$ and $T_7$ were both set to 430° C. and the times $t_6$ and $t_7$ were set to 10 hours and 160 hours respectively. In the plasma nitriding step, the discharge voltage and the discharge current were controlled in the ranges of at least 200 V and not more than 450 V and at least 1 A and not more than 5 A respectively, so that the treatment temperature $T_6$ in the plasma nitriding was 430° C. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding.

The diffusion step was so carried out that the specimen was heated in an atmosphere furnace with an atmosphere of nitrogen to adjust the total of a carbon concentration and a nitrogen concentration in the surface of the specimen being not more than 1.9 mass %. The specimen subjected to the heat treatment method for steel in the present invention was employed as the sample according to Example of the present invention (Example A of the present invention).

On the other hand, a heat treatment step similar to the heat treatment method for steel, as described with reference to FIG. 11 in the above embodiment was carried out on a similarly prepared specimen of AMS 6490 without carrying out the diffusion step. The temperatures $T_1$, $T_2$, $T_3$, $T_4$ and $T_5$ and the times $t_1$, $t_2$, $t_3$, $t_4$ and $t_5$ were so set that the hardness of the specimen after the third tempering step was at least 58 HRC and not more than 65 HRC, while the temperature $T_6$ was set to 480° C. and the time $t_6$ was set to 30 hours. In the plasma nitriding step, the discharge voltage and the discharge current were controlled in the ranges of at least 200 V and not more than 450 V and at least 1 A and not more than 5 A respectively, so that the treatment temperature $T_6$ in the plasma nitriding was 480° C. In the plasma nitriding step, further, gas was introduced into a furnace in the ratios of nitrogen ($N_2$):hydrogen ($H_2$):methane ($CH_4$)=79:80:1 so that the pressure in the furnace was at least 267 Pa and not more than 400 Pa in the plasma nitriding. The specimen subjected to the aforementioned heat treatment method was employed as a sample according to comparative example (comparative example A).

The samples according to Example A of the present invention and comparative example A prepared in the aforementioned manner were cut along sections perpendicular to the surfaces thereof, and these sections were polished. Further, the polished sections were etched with an etchant, and five fields of view of square regions of 150 μm on each side including the surface were thereafter randomly observed on each sample.

Figure 21:
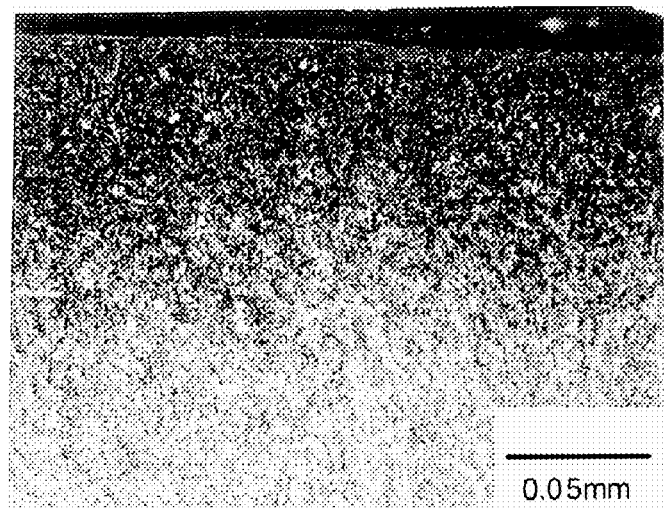
FIG. 21 is an optical micrograph of a microstructure around the surface of Example A of the present invention.
Figure 22:
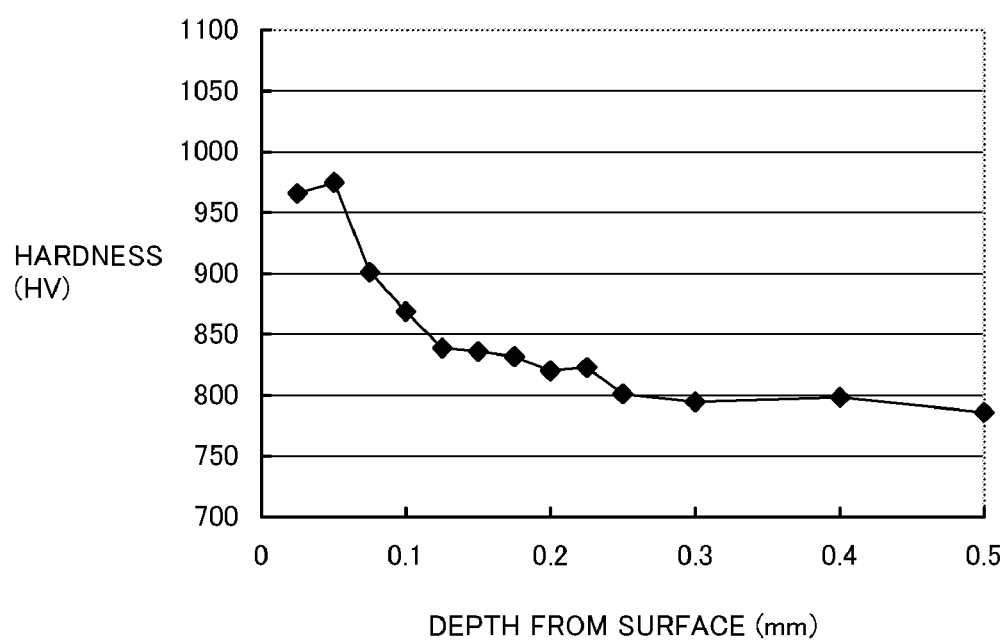
FIG. 22 illustrates a hardness distribution around the surface of Example A of the present invention.
Figure 23:
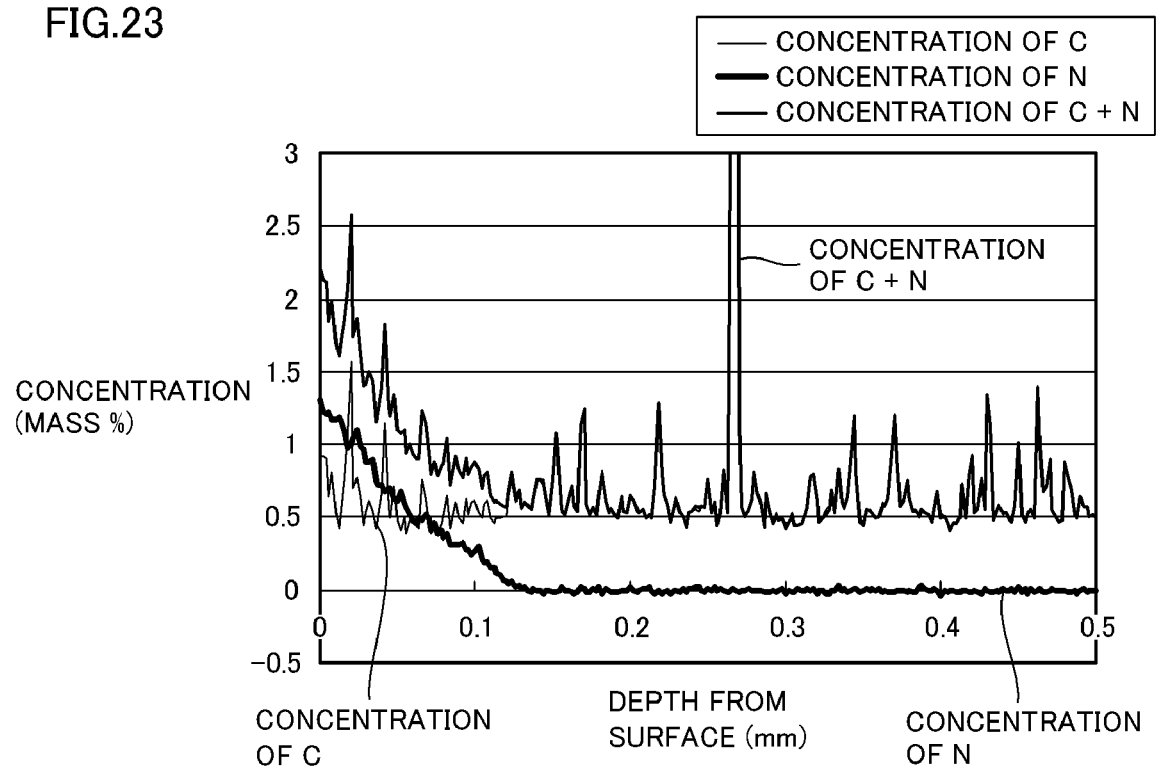
FIG. 23 illustrates distributions of concentrations of carbon and nitrogen around the surface of Example A of the present invention.
Figure 24:
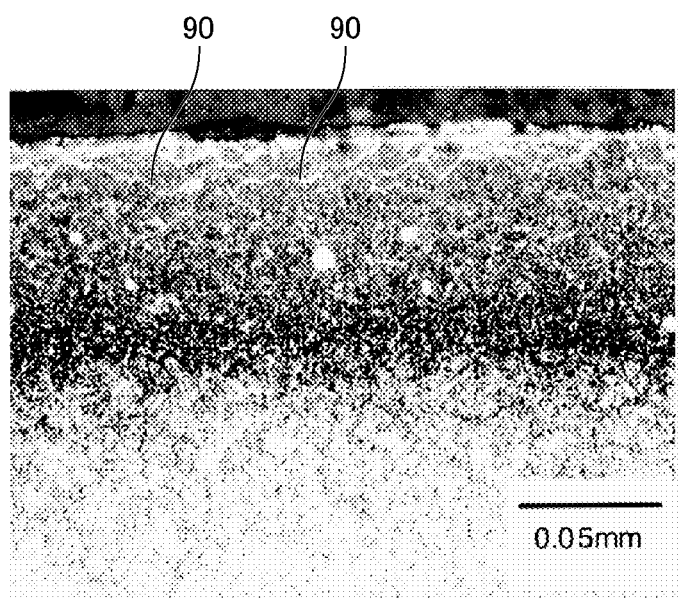
FIG. 24 is an optical micrograph of a microstructure around the surface of comparative example A.
Figure 25:
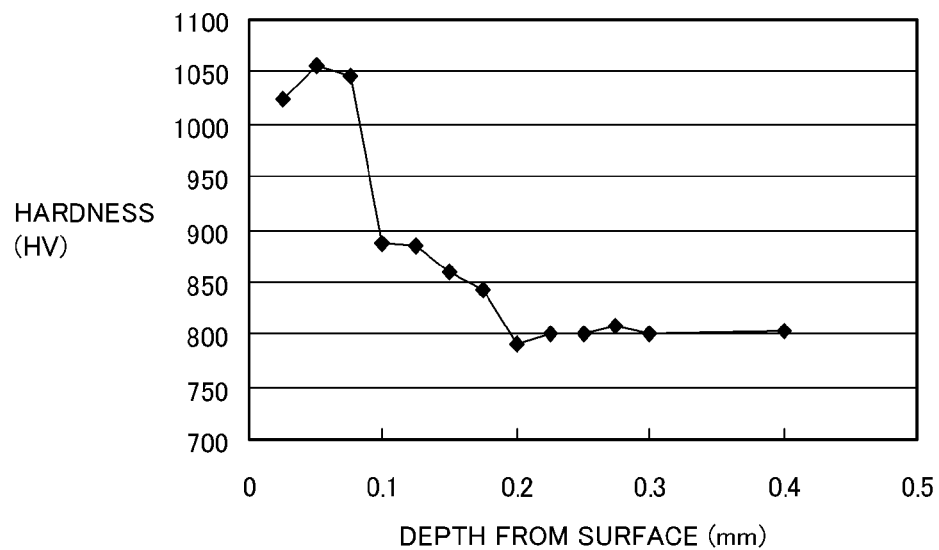
FIG. 25 illustrates a hardness distribution around the surface of comparative example A.
Figure 26:
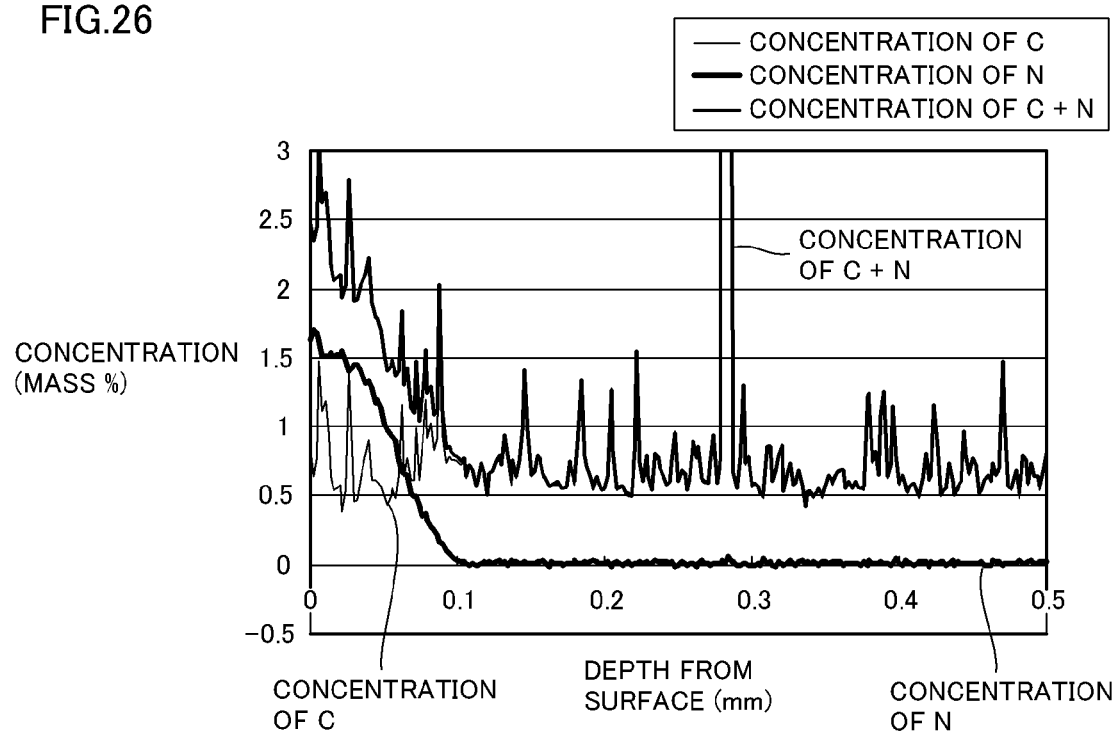
FIG. 26 illustrates distributions of concentrations of carbon and nitrogen around the surface of comparative example A.

The results of the experiment will now be described with reference to FIG. 21 to FIG. 26. Referring to FIG. 21 and FIG. 24, upper portions of photographs correspond to the surfaces of the samples. Referring to FIG. 22 and FIG. 25, the axes of abscissas show depths (distances) from the surfaces, and the axes of ordinates show hardness levels (Vickers hardness). Referring to FIG. 23 and FIG. 26, the axes of abscissas show the depths (distances) from the surfaces and the axes of ordinates show the concentrations of carbon and nitrogen, while carbon concentrations (C concentrations), nitrogen concentrations (N concentrations) and totals (C+N concentrations) of the carbon concentrations and the nitrogen concentrations are shown in these drawings.

Referring to FIG. 21, no grain boundary precipitates (nitride of iron having an aspect ratio of at least 2 and a length of at least 7.5 μm) are observed on the surface layer portion of the sample according to Example A of the present invention, and the sample has an excellent microstructure. Referring to FIG. 22 and FIG. 23, a region of the sample according to Example A of the present invention within 0.5 mm in depth from the surface has sufficient hardness of at least 950 HV, with penetration of a sufficient quantity of nitrogen. When finishing such as polishing is performed on the surface of a steel member subjected to a heat treatment similar to that in Example A of the present invention, therefore, a mechanical component provided with a nitrogen-enriched layer having a nitrogen concentration of at least 0.05 mass %, a total of a carbon concentration and the nitrogen concentration of at least 0.82 mass % and not more than 1.9 mass %, a thickness of at least 0.11 mm and hardness of at least 830 HV can be produced so that the number of grain boundary precipitates is not more than one in five fields of view of square regions of 150 μm on each side when the nitrogen-enriched layer is observed with a microscope.

Referring to FIG. 24, on the other hand, a large number of grain boundary precipitates 90 are observed in the surface layer portion of the sample according to comparative example A out of the range of the present invention. Referring to FIG. 25 and FIG. 26, a region of the sample according to comparative example A within 0.5 mm in depth from the surface has sufficient hardness of at least 950 HV with penetration of a sufficient quantity of nitrogen, similarly to the sample according to Example A of the present invention. When finishing such as polishing is performed on the surface of a steel member subjected to a heat treatment similar to that in comparative example A, therefore, a mechanical component having grain boundary precipitates remaining in a surface layer portion is obtained, although the surface layer portion thereof has high hardness. This mechanical component cannot be regarded as having sufficient fatigue resistance and toughness as described above.

Thus, it has been confirmed that a mechanical component made of steel containing at least 3.75 mass % of chromium and provided with a nitrogen-enriched layer formed on a surface layer portion thereof while sufficiently ensuring fatigue resistance and toughness can be produced according to the method of producing a mechanical component employing the heat treatment method for steel according to the above embodiment.

Example 2

Example 2 of the present invention will now be described. An experiment of investigating the proper range of the heating temperature in the diffusion step of the heat treatment method for steel, as described in the first embodiment, was conducted. The procedure of the experiment is as follows:

First, a specimen having an outer diameter φ of 40 mm, an inner diameter φ of 30 mm and a thickness t of 16 mm was produced by preparing and working a steel material made of AMS 6490 (AISI M50), a steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity.

Then, the steps from the quenching step to the third tempering step included in the heat treatment step employing the method of heat-treating steel described in the above embodiment with reference to FIG. 11 were carried out on this specimen similarly to the case of Example A of the present invention in the aforementioned Example 1. Then, a step similar to the diffusion step was carried out by maintaining the specimen at temperatures of 430° C. to 570° C. for various times, and hardness of the specimen was measured. The results of the measurement were analyzed on the basis of reaction kinetics, for calculating the relation between the heat treatment time (diffusion time) at each heating temperature in the diffusion step and the hardness.

On the other hand, another experiment was conducted by carrying out the steps from the quenching step to the third tempering step on a similar specimen similarly to the case of Example A of the present invention in the aforementioned Example 1 and thereafter actually performing a plasma nitriding step and a diffusion step, for confirming a hardness distribution in the specimen. In the plasma nitriding step, plasma nitriding was performed by controlling a discharge voltage and a discharge current in the ranges of at least 200 V and not more than 450 V and at least 1 A and not more than 5 A respectively so that the treatment temperature $T_6$ in the plasma nitriding was 480° C. and maintaining the specimen at this temperature for one hour. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding. In addition, the diffusion step was carried out on the specimen completely subjected to the plasma nitriding step by maintaining the same at 480° C. for 50 hours. A hardness distribution on a surface layer portion of the specimen was measured before and after the diffusion step.

Figure 27:
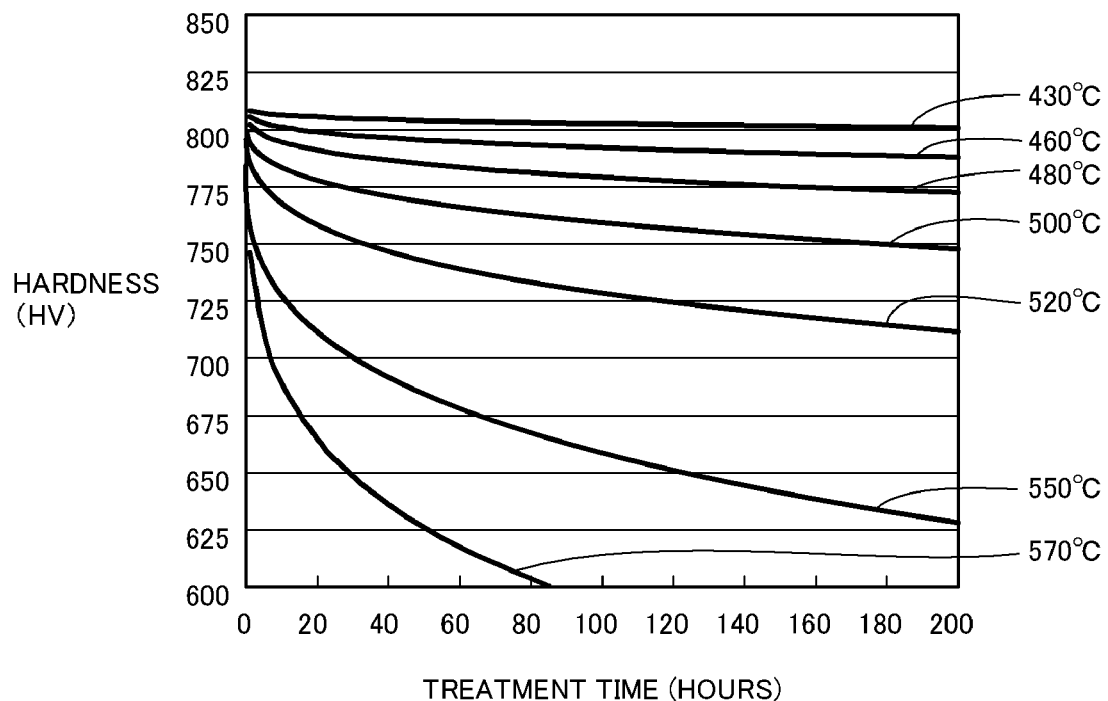
FIG. 27 is a diagram (Avrami's plot) showing the relation between heat treatment times at respective heating temperatures in a diffusion step and the hardness levels of a mother phase.
Figure 28:
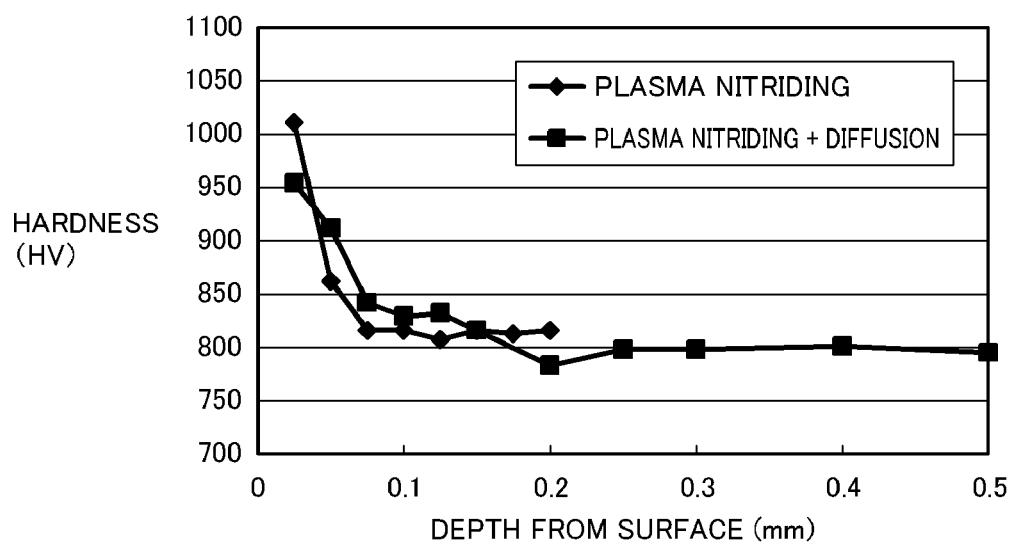
FIG. 28 illustrates hardness distributions on surface layer portions of specimens.

The results of the experiments will now be described with reference to FIG. 27 and FIG. 28. Referring to FIG. 27, the axis of abscissas shows heat treatment times (diffusion times), and the axis of ordinates shows hardness levels of the specimens. Referring to FIG. 28, the axis of abscissas shows depths (distances) from the surfaces, and the axis of ordinates shows hardness levels. Referring to FIG. 28, rhombuses show hardness levels of the specimens not yet subjected to the diffusion steps, and squares show hardness levels of the specimens subjected to the diffusion steps of maintaining the same at 480° C. for 50 hours.

Referring to FIG. 27, the hardness of each specimen is reduced in a shorter time as the diffusion temperature is increased, while the reduction in the hardness is not more than 40 HV even if the diffusion treatment is performed for 200 hours and influence exerted by the reduction in the hardness of the matrix (hardness in a region not influenced by penetration of nitrogen resulting from the plasma nitriding) on the hardness of the surface layer portion is reduced when the diffusion temperature reaches 480° C. When the diffusion temperature reaches 460° C., the reduction in the hardness is not more than 25 HV even if the diffusion treatment is performed for 200 hours, and influence exerted by the reduction in the hardness of the matrix on the hardness of the surface layer portion is further reduced. When the diffusion temperature reaches 430° C., the reduction in the hardness is not more than 10 HV even if the diffusion treatment is performed for 200 hours, and the reduction in the hardness of the matrix hardly influences the hardness of the surface layer portion.

Referring to FIG. 28, on the other hand, the actual reduction in the hardness of the matrix substantially coincides with the results of analysis shown in FIG. 27 when the diffusion step of maintaining each specimen at 480° C. for 50 hours is carried out, and the results of analysis shown in FIG. 27 conceivably coincide with the results of the actual heat treatment.

From the aforementioned results of the experiments, the heating temperature (diffusion temperature) in the diffusion step must be set to not more than 480° C., and is preferably set to not more than 460° C., in view of making nitrogen penetrating into steel reach a desired region while suppressing influence exerted by reduction in the hardness of the matrix on the hardness of the surface layer portion. When the heating temperature is set to not more than 430° C., the diffusion step can be carried out while hardly exerting influence by reduction in the hardness of the matrix on the hardness of the surface layer portion. While the heating temperature in the diffusion step is preferably further reduced in view of suppressing influence exerted by reduction in the hardness of the matrix on the hardness of the surface layer portion, this heating temperature is preferably set to at least 300° C., in order to prevent the time required for making nitrogen penetrating into steel reach the desired region from being increased beyond an allowable limit in actual production steps.

Example 3

Example 3 of the present invention will now be described. A sample having a structure similar to that of the present mechanical component was actually prepared in the method of producing the mechanical component that adopts the heat treatment method for steel in the third embodiment, and subjected to an experiment of confirming that formation of grain boundary precipitates was suppressed on a surface layer portion. The procedure of the experiment is as follows:

First, a specimen having an outer diameter φ of 40 mm, an inner diameter φ of 30 mm and a thickness t of 16 mm was produced by preparing and working a steel material made of AMS 6278 (AISI M50 NiL), a steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity.

Then, a heat treatment step employing the heat treatment method described with reference to FIG. 19 in the third embodiment was carried out on this specimen. The temperatures $T_{11}$, $T_{12}$, $T_{13}$, $T_{14}$, $T_{15}$ and $T_{16}$ and the times $t_{11}$, $t_{12}$, $t_{13}$, $t_{14}$, $t_{15}$ and $t_{16}$ were so set that the hardness of the specimen after the third tempering step was at least 58 HRC and not more than 65 HRC, while the temperatures $T_{17}$ and $T_{18}$ were both set to 430° C. and the times $t_{17}$ and $t_{18}$ were set to 10 hours and 160 hours respectively. In the plasma nitriding step, the discharge voltage and the discharge current were controlled in the ranges of at least 200 V and not more than 450 V and at least 1 A and not more than 5 A respectively, so that the treatment temperature $T_{17}$ in the plasma nitriding was 430° C. In the plasma nitriding step, further, gas was introduced into a furnace in the ratio of nitrogen ($N_2$):hydrogen ($H_2$)=1:1 so that the pressure in the furnace was at least 267 Pa and not more than 400 Pa in the plasma nitriding.

The diffusion step was so carried out that the specimen was heated in an atmosphere furnace with an atmosphere of nitrogen to adjust the total of a carbon concentration and a nitrogen concentration in the surface of the specimen being not more than 1.9 mass %. The specimen subjected to the heat treatment method for steel in the present invention as described above was employed as the sample according to Example of the present invention (Example B of the present invention).

On the other hand, a heat treatment step similar to the heat treatment method for steel, as described in the third embodiment with reference to FIG. 19, was carried out on a similarly prepared specimen of AMS 6278 without carrying out the diffusion step. The temperatures $T_{11}$, $T_{12}$, $T_{13}$, $T_{14}$, $T_{15}$ and $T_{16}$ and the times $t_{11}$, $t_{12}$, $t_{13}$, $t_{14}$, $t_{15}$ and $t_{16}$ were so set that the hardness of the specimen after the third tempering step was at least 58 HRC and not more than 65 HRC, while the temperature $T_{17}$ was set to 480° C. and the time $t_{17}$ was set to 30 hours. In the plasma nitriding step, the discharge voltage and the discharge current were controlled in the ranges of at least 200 V and not more than 450 V and at least 1 A and not more than 5 A respectively, so that the treatment temperature $T_{17}$ in the plasma nitriding was 480° C. In the plasma nitriding step, further, gas was introduced into a furnace in the ratios of nitrogen ($N_2$):hydrogen ($H_2$):methane ($CH_4$)=79:80:1 so that the pressure in the furnace was at least 267 Pa and not more than 400 Pa in the plasma nitriding. The specimen subjected to the aforementioned heat treatment method was employed as a sample according to comparative example (comparative example B).

The samples according to Example B of the present invention and comparative example B prepared in the aforementioned manner were cut along sections perpendicular to the surfaces thereof, and these sections were polished. Further, the polished sections were etched with an etchant, and five fields of view of square regions of 150 μm on each side including the surface were thereafter randomly observed on each sample.

Figure 29:
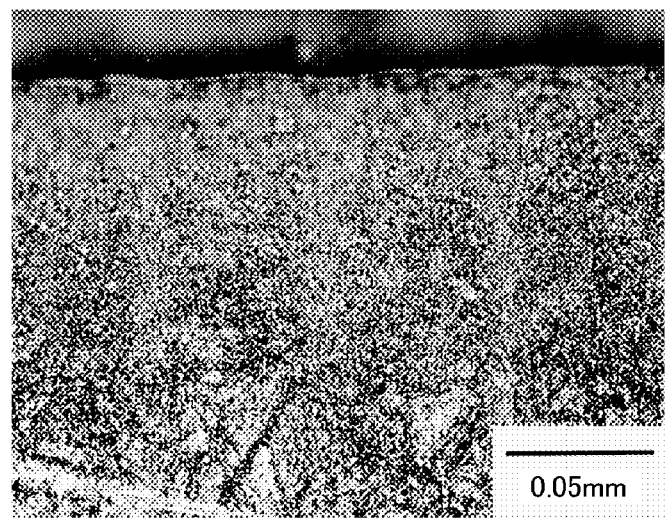
FIG. 29 is an optical micrograph of a microstructure around the surface of Example B of the present invention.
Figure 30:
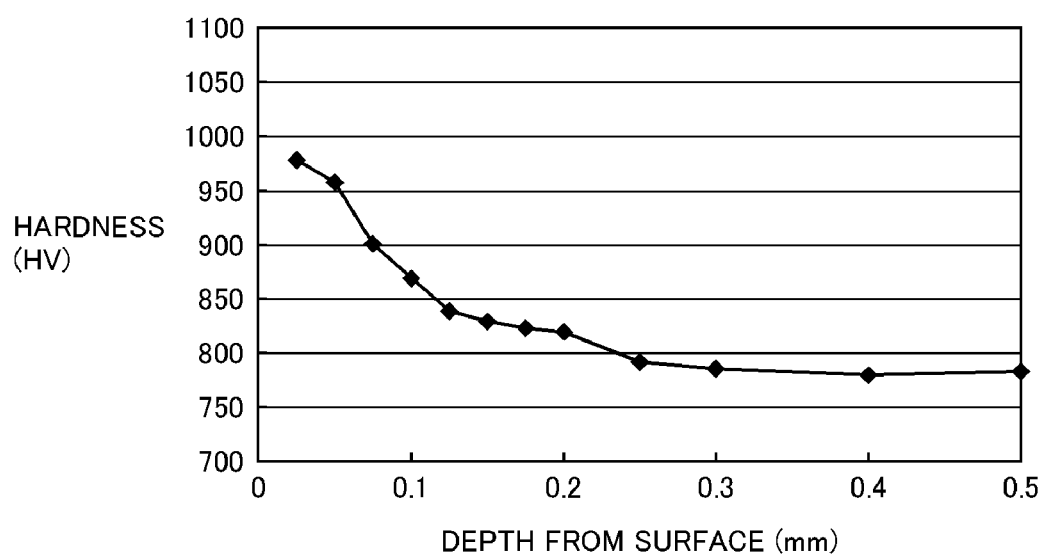
FIG. 30 illustrates a hardness distribution around the surface of Example B of the present invention.
Figure 31:
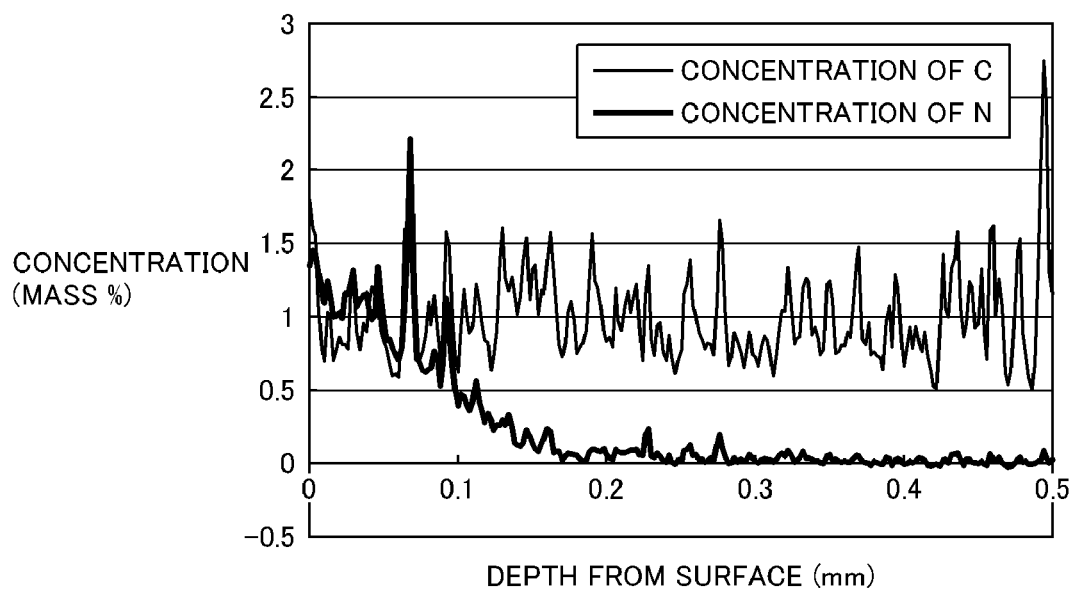
FIG. 31 illustrates distributions of concentrations of carbon and nitrogen around the surface of Example B of the present invention.
Figure 32:
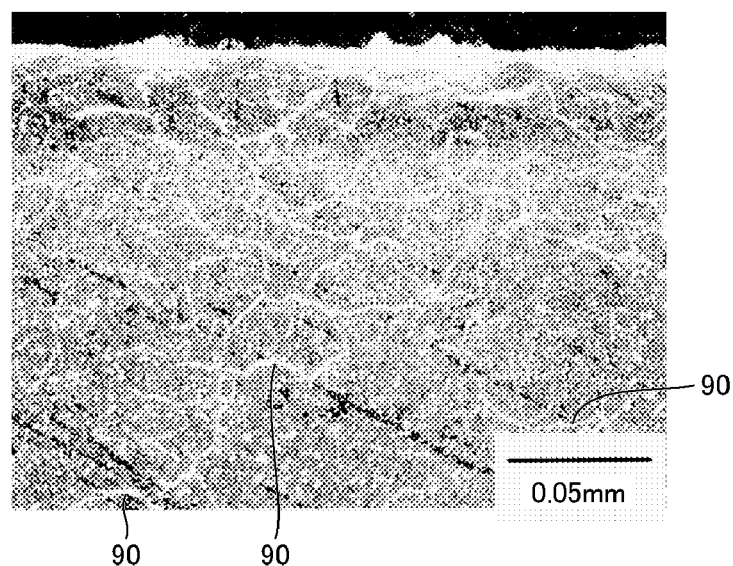
FIG. 32 is an optical micrograph of a microstructure around the surface of comparative example B.
Figure 33:
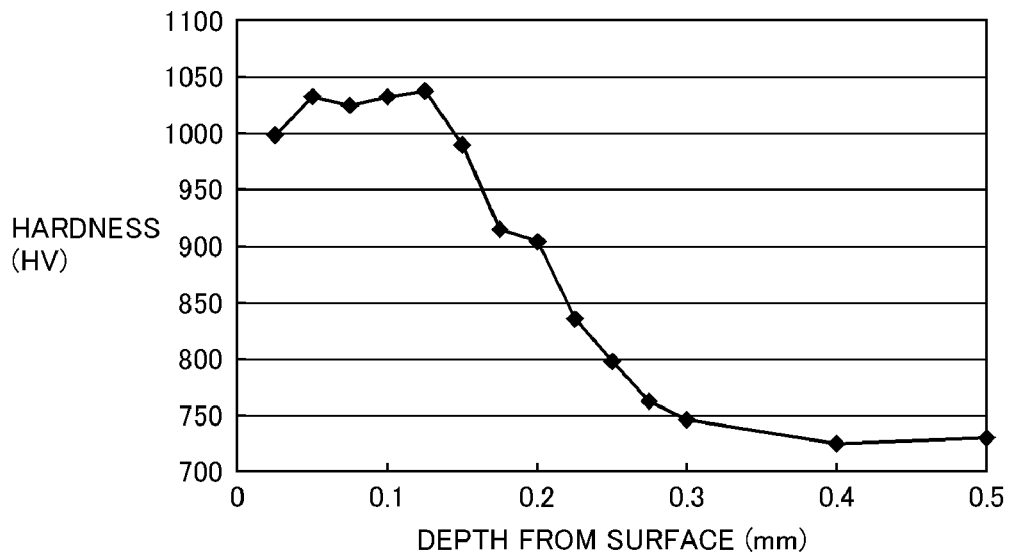
FIG. 33 illustrates a hardness distribution around the surface of comparative example B.
Figure 34:
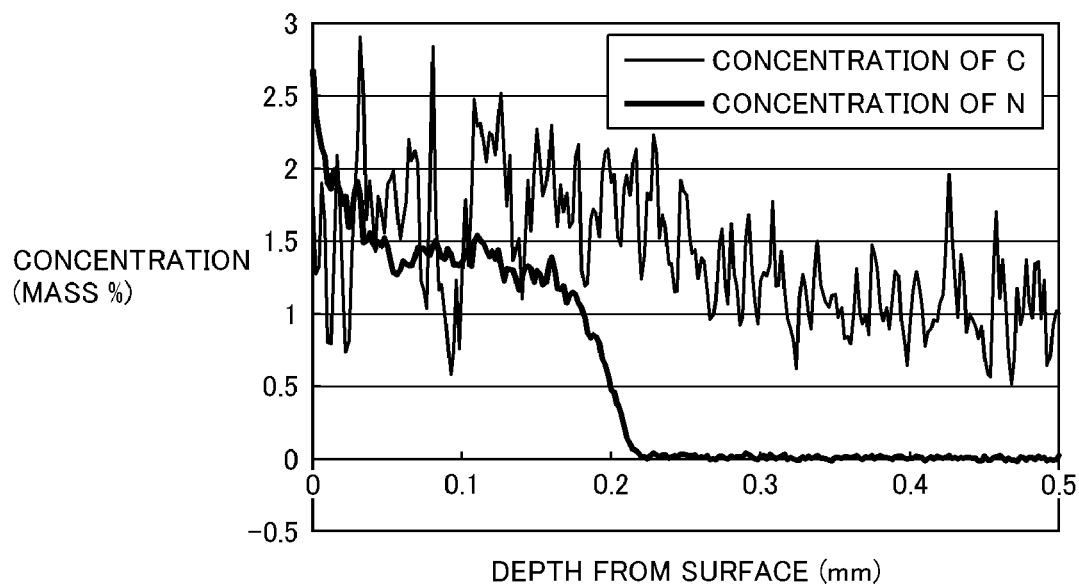
FIG. 34 illustrates distributions of concentrations of carbon and nitrogen around the surface of comparative example B.

The results of the experiment will now be described with reference to FIG. 29 to FIG. 34. Referring to FIG. 29 and FIG. 32, upper portions of photographs correspond to the surfaces of the samples. Referring to FIG. 30 and FIG. 33, the axes of abscissas show depths (distances) from the surfaces, and the axes of ordinates show hardness levels (Vickers hardness). Referring to FIG. 31 and FIG. 34, the axes of abscissas show the depths (distances) from the surfaces, and the axes of ordinates show the concentrations of carbon and nitrogen with thin lines and thick lines respectively.

Referring to FIG. 29, no grain boundary precipitates (nitride of iron having an aspect ratio of at least 2 and a length of at least 7.5 μm) are observed on the surface layer portion of the sample according to Example B of the present invention, and the sample has an excellent microstructure. Referring to FIG. 30 and FIG. 31, a region of the sample according to Example B of the present invention within 0.5 mm in depth from the surface has sufficient hardness of at least 950 HV, with penetration of a sufficient quantity of nitrogen. When finishing such as polishing is performed on the surface of a steel member subjected to a heat treatment similar to that in Example B of the present invention, therefore, a mechanical component provided with a nitrogen-enriched layer having a nitrogen concentration of at least 0.05 mass %, a total of a carbon concentration and the nitrogen concentration of at least 0.55 mass % and not more than 1.9 mass %, a thickness of at least 0.11 mm and hardness of at least 800 HV can be produced so that the number of grain boundary precipitates is not more than one in five fields of view of square regions of 150 μm on each side when the nitrogen-enriched layer is observed with a microscope.

Referring to FIG. 32, on the other hand, a large number of grain boundary precipitates 90 are observed in the surface layer portion of the sample according to comparative example B out of the range of the present invention. Referring to FIG. 33 and FIG. 34, a region of the sample according to comparative example B within 0.5 mm in depth from the surface has sufficient hardness of at least 950 HV with penetration of a sufficient quantity of nitrogen, similarly to the sample according to Example B of the present invention. When finishing such as polishing is performed on the surface of a steel member subjected to a heat treatment similar to that in comparative example B, therefore, a mechanical component having grain boundary precipitates remaining in a surface layer portion is obtained although the surface layer portion thereof has high hardness. This mechanical component cannot be regarded as having sufficient fatigue resistance and toughness as described above.

Thus, it has been confirmed that the present mechanical component made of steel containing at least 4 mass % of chromium and provided with a nitrogen-enriched layer formed on a surface layer portion thereof while sufficiently ensuring fatigue resistance and toughness can be produced according to the method of producing a mechanical component employing the heat treatment method for steel according to the third embodiment.

Example 4

Example 4 of the present invention will now be described. An experiment of investigating the proper range of the heating temperature in the diffusion step of the heat treatment method for steel, as described with reference to the third embodiment, was conducted. The procedure of the experiment is as follows:

First, a specimen having an outer diameter ϕ of 40 mm, an inner diameter ϕ of 30 mm and a thickness t of 16 mm was produced by preparing and working a steel material made of AMS 6278 (AISI M50 NiL), a steel containing at least 0.11 mass % and not more than 0.15 mass % of carbon, at least 0.1 mass % and not more than 0.25 mass % of silicon, at least 0.15 mass % and not more than 0.35 mass % of manganese, at least 3.2 mass % and not more than 3.6 mass % of nickel, at least 4 mass % and not more than 4.25 mass % of chromium, at least 4 mass % and not more than 4.5 mass % of molybdenum and at least 1.13 mass % and not more than 1.33 mass % of vanadium with a remainder consisting of iron and impurity.

Then, the steps from the carburizing step to the third tempering step included in the heat treatment step employing the method of heat-treating steel described in the third embodiment with reference to FIG. 19 were carried out on this specimen similarly to the case of Example B of the present invention in the aforementioned Example 3. A step similar to the diffusion step was carried out by maintaining the specimen at temperatures of 430° C. to 570° C. for various times, and hardness of a carburized layer was measured. More specifically, hardness was measured on nine points in a region having a distance of at least 0.2 mm and not more than 0.4 mm from the surface of the specimen, and the lowest hardness was calculated. The results of the measurement were analyzed on the basis of reaction kinetics, for calculating the relation between the heat treatment time (diffusion time) at each heating temperature in the diffusion step and the hardness of the carburized layer.

On the other hand, another experiment was conducted by carrying out the steps from the carburizing step to the third tempering step on a similar specimen similarly to the case of Example B of the present invention in the aforementioned Example 3 and actually performing a plasma nitriding step and a diffusion step for confirming a hardness distribution in the specimen. In the plasma nitriding step, plasma nitriding was performed by controlling a discharge voltage and a discharge current in the ranges of at least 200 V and not more than 450 V and at least 1 A and not more than 5 A respectively so that the treatment temperature $T_{17}$ in the plasma nitriding was 480° C. and maintaining the specimen at this temperature for one hour. In the plasma nitriding step, further, gas was introduced into a furnace in the ratio of nitrogen $(N_2)$:hydrogen $(H_2)$=1:1 so that the pressure in the furnace was at least 267 Pa and not more than 400 Pa in the plasma nitriding. In addition, the diffusion step was carried out on the specimen completely subjected to the plasma nitriding step by maintaining the same at 480° C. for 50 hours. A hardness distribution on a surface layer portion of the specimen was measured before and after the diffusion step.

Figure 35:
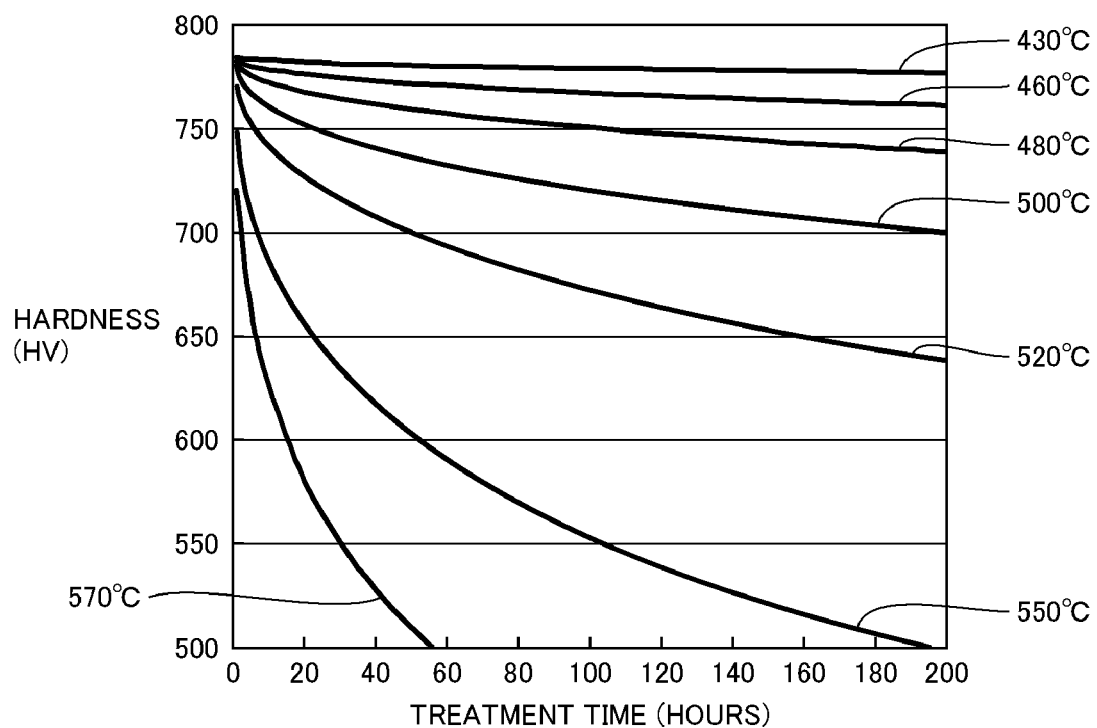
FIG. 35 is a diagram (Avrami's plot) showing the relation between heat treatment times at respective heating temperatures in a diffusion step and the hardness levels of carburized layers.
Figure 36:
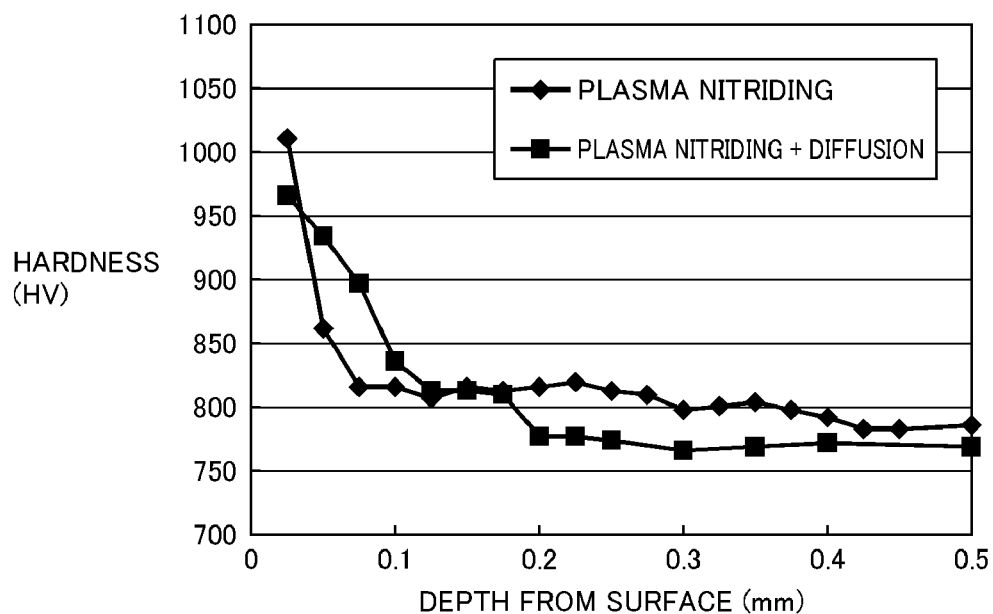
FIG. 36 illustrates hardness distributions on surface layer portions of specimens.

The results of the experiments will now be described with reference to FIG. 35 and FIG. 36. Referring to FIG. 35, the axis of abscissas shows heat treatment times (diffusion times), and the axis of ordinates shows hardness levels of the carburized layer. Referring to FIG. 36, the axis of abscissas shows depths (distances) from the surfaces, and the axis of ordinates shows hardness levels. Referring to FIG. 36, rhombuses show hardness levels of the specimens not yet subjected to the diffusion steps, and squares show hardness levels of the specimens subjected to the diffusion steps of maintaining the same at 480° C. for 50 hours.

Referring to FIG. 35, the hardness of the carburized layer of each specimen is reduced in a shorter time as the diffusion temperature is increased, while the reduction in the hardness is not more than 50 HV even if the diffusion treatment is performed for 200 hours and influence exerted by reduction in the hardness of the matrix (hardness in a region of the carburized layer not influenced by penetration of nitrogen resulting from plasma nitriding) on the hardness of the surface layer portion is reduced when the diffusion temperature reaches 480° C. When the diffusion temperature reaches 460° C., the reduction in the hardness is not more than 30 HV even if the diffusion treatment is performed for 200 hours, and influence exerted by the reduction in the hardness of the matrix on the hardness of the surface layer portion is further reduced. When the diffusion temperature reaches 430° C., the reduction in the hardness is not more than 10 HV even if the diffusion treatment is performed for 200 hours, and the reduction in the hardness of the matrix hardly influences the hardness of the surface layer portion.

Referring to FIG. 36, on the other hand, the actual reduction in the hardness of the matrix substantially coincides with the results of analysis shown in FIG. 35 when the diffusion step of maintaining each specimen at 480° C. for 50 hours is carried out, and the results of analysis shown in FIG. 35 conceivably coincide with the results of the actual heat treatment.

From the aforementioned results of the experiments, the heating temperature (diffusion temperature) in the diffusion step must be set to not more than 480° C., and is preferably set to not more than 460° C., in view of making nitrogen penetrating into steel reach a desired region while suppressing influence exerted by reduction in the hardness of the matrix on the hardness of the surface layer portion. When the heating temperature is set to not more than 430° C., the diffusion step can be carried out while hardly exerting influence by reduction in the hardness of the matrix on the hardness of the surface layer portion. While the heating temperature in the diffusion step is preferably further reduced in view of suppressing influence exerted by reduction in the hardness of the matrix on the hardness of the surface layer portion, this heating temperature is preferably set to at least 300° C., in order to prevent the time required for making nitrogen penetrating into steel reach the desired region from being increased beyond an allowable limit in actual production steps.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present mechanical component is advantageously applicable to mechanical components that are formed of steel containing at least 3.75 mass % of chromium and have a surface layer portion having a nitrogen enriched layer, in particular. Furthermore, the present rolling bearing is advantageously applicable to rolling bearings required to exhibit improved durability under severe conditions, in particular.

The invention claimed is:

1. A mechanical component formed of steel containing at least 0.77 mass % and not more than 0.85 mass % of carbon, at least 0.01 mass % and not more than 0.25 mass % of silicon, at least 0.01 mass % and not more than 0.35 mass % of manganese, at least 0.01 mass % and not more than 0.15 mass % of nickel, at least 3.75 mass % and not more than 4.25 mass % of chromium, at least 4 mass % and not more than 4.5 mass % of molybdenum and at least 0.9 mass % and not more than 1.1 mass % of vanadium with a remainder consisting of iron and impurity, and having a surface, said surface being included in a region having a nitrogen enriched layer having a nitrogen concentration of at least 0.05 mass %, said nitrogen enriched layer having a carbon concentration and the nitrogen concentration, in total, of at least 0.82 mass % and not more than 1.9 mass % throughout all of the nitrogen enriched layer other than where carbides and nitrides are formed.

2. The mechanical component according to claim 1, wherein said nitrogen enriched layer has a thickness of at least 0.11 mm.

3. The mechanical component according to claim 1, wherein said nitrogen enriched layer has a hardness of at least 830 HV.

4. The mechanical component according to claim 1, wherein said nitrogen enriched layer, as observed with a microscope, has one or less nitride of iron having an aspect ratio of at least 2 and a length of at least 7.5 μm in five fields of view each of a square region having each side of 150 μm.

5. The mechanical component according to claim 1, used as a bearing component.

6. A rolling bearing comprising:
a race member; and
a plurality of rolling elements disposed in contact with said race member on an annular raceway, said race member being the mechanical component according to claim 1, said rolling elements being formed of ceramic.

7. The rolling bearing according to claim 6, provided in a gas turbine engine and supporting a rotary member that is one of a main shaft and a member rotating as said main shaft rotates, relative to a member adjacent to said rotary member rotatably.

* * * * *